US012237918B2

(12) United States Patent
Luo et al.

(10) Patent No.: US 12,237,918 B2
(45) Date of Patent: Feb. 25, 2025

(54) WIRELESS DEVICES AND SYSTEMS INCLUDING EXAMPLES OF MIXING COEFFICIENT DATA SPECIFIC TO A PROCESSING MODE SELECTION

(71) Applicant: MICRON TECHNOLOGY, INC., Boise, ID (US)

(72) Inventors: Fa-Long Luo, San Jose, CA (US); Jaime Cummins, Bainbridge Island, WA (US); Jeremy Chritz, Seattle, WA (US); Tamara Schmitz, Scotts Valley, CA (US)

(*) Notice: Subject to any disclaimer, the term of this patent is extended or adjusted under 35 U.S.C. 154(b) by 0 days.

(21) Appl. No.: 18/318,162

(22) Filed: May 16, 2023

(65) Prior Publication Data

US 2023/0283405 A1 Sep. 7, 2023

Related U.S. Application Data

(63) Continuation of application No. 17/394,601, filed on Aug. 5, 2021, now Pat. No. 11,695,503, which is a
(Continued)

(51) Int. Cl.
*H04K 1/10* (2006.01)
*H04L 1/00* (2006.01)
(Continued)

(52) U.S. Cl.
CPC .......... *H04L 1/0045* (2013.01); *H04L 1/0041* (2013.01); *H04L 1/0057* (2013.01);
(Continued)

(58) Field of Classification Search
CPC ............... H04L 1/0045; H04L 27/0008; H04L 27/2646; H04L 1/0041; H04L 1/0057;
(Continued)

(56) References Cited

U.S. PATENT DOCUMENTS 5,532,950 A 7/1996 Moses et al.
5,712,922 A 1/1998 Loewenthal et al.
(Continued)

FOREIGN PATENT DOCUMENTS

CN 1555608 A 12/2004
CN 1722723 A 1/2006
(Continued)

OTHER PUBLICATIONS

U.S. Appl. No. 17/394,601 titled "Wireless Devices and Systems Including Examples of Mixing Coefficient Data Specific to a Processing Mode Selection" filed Aug. 5, 2021, pp. all pages of application as filed.
(Continued)

*Primary Examiner* — Phuong Phu
(74) *Attorney, Agent, or Firm* — Dorsey & Whitney LLP

(57) ABSTRACT

Examples described herein include systems and methods which include wireless devices and systems with examples of mixing input data with coefficient data specific to a processing mode selection. For example, a computing system with processing units may mix the input data for a transmission in a radio frequency (RF) wireless domain with the coefficient data to generate output data that is representative of the transmission being processed according to a specific processing mode selection. The processing mode selection may include a single processing mode, a multi-processing mode, or a full processing mode. The processing mode selection may be associated with an aspect of a wireless protocol. Examples of systems and methods described herein may facilitate the processing of data for 5G wireless communications in a power-efficient and time-efficient manner.

19 Claims, 9 Drawing Sheets

Related U.S. Application Data continuation of application No. 16/594,503, filed on Oct. 7, 2019, now Pat. No. 11,088,888, which is a continuation of application No. 15/941,532, filed on Mar. 30, 2018, now Pat. No. 10,484,225, which is a continuation of application No. 15/365,397, filed on Nov. 30, 2016, now Pat. No. 9,942,074.

(51) Int. Cl.
   *H04L 27/00* (2006.01)
   *H04L 27/26* (2006.01)
   *H04L 27/28* (2006.01)
   *H04B 1/04* (2006.01)

(52) U.S. Cl.
   CPC ........ *H04L 1/0071* (2013.01); *H04L 27/0008* (2013.01); *H04L 27/2628* (2013.01); *H04L 27/2646* (2013.01); *H04B 2001/0408* (2013.01); *H04L 27/26414* (2021.01); *H04L 27/26416* (2021.01)

(58) Field of Classification Search
   CPC .............. H04L 1/0071; H04L 27/2628; H04L 27/26414; H04L 27/26416; H04L 5/0007; H04B 2001/0408; G05B 17/02; H02J 50/12
   USPC .......................................... 375/260, 295, 316
   See application file for complete search history.

(56) References Cited

U.S. PATENT DOCUMENTS

| | | | |
|---|---|---|---|
| 6,490,269 B1 | 12/2002 | Yamaura | |
| 8,773,969 B1 | 7/2014 | Zhang et al. | |
| 8,867,633 B2 | 10/2014 | Suehiro | |
| 9,088,168 B2* | 7/2015 | Mach .................. | H02J 50/12 |
| 9,942,074 B1 | 4/2018 | Luo et al. | |
| 10,027,523 B2 | 7/2018 | Chritz et al. | |
| 10,439,855 B2 | 10/2019 | Chritz et al. | |
| 10,484,225 B2 | 11/2019 | Luo et al. | |
| 10,886,998 B2 | 1/2021 | Luo et al. | |
| 10,924,152 B1 | 2/2021 | Luo | |
| 10,979,097 B2 | 4/2021 | Luo | |
| 11,088,888 B2 | 8/2021 | Luo et al. | |
| 11,115,256 B2 | 9/2021 | Chritz et al. | |
| 11,258,473 B2 | 2/2022 | Luo | |
| 11,424,764 B2 | 8/2022 | Luo | |
| 11,528,048 B2 | 12/2022 | Luo | |
| 11,569,851 B2 | 1/2023 | Luo | |
| 11,658,687 B2* | 5/2023 | Chritz .................. | H04B 1/0039 |
| | | | 375/295 |
| 11,671,291 B2 | 6/2023 | Luo et al. | |
| 11,695,503 B2* | 7/2023 | Luo ...................... | H04L 1/0057 |
| | | | 375/219 |
| 11,755,408 B2 | 9/2023 | Luo et al. | |
| 11,838,046 B2 | 12/2023 | Luo | |
| 2001/0024447 A1 | 9/2001 | Yoshio et al. | |
| 2003/0120363 A1 | 6/2003 | Luo et al. | |
| 2003/0144827 A1 | 7/2003 | Yang | |
| 2004/0120421 A1 | 6/2004 | Filipovic | |
| 2004/0218683 A1 | 11/2004 | Batra et al. | |
| 2005/0141632 A1 | 6/2005 | Choi et al. | |
| 2005/0198472 A1 | 9/2005 | Sih et al. | |
| 2006/0098605 A1 | 5/2006 | Li | |
| 2006/0227736 A1 | 10/2006 | Conyers et al. | |
| 2007/0274324 A1 | 11/2007 | Wu et al. | |
| 2008/0004078 A1 | 1/2008 | Barratt et al. | |
| 2008/0165891 A1 | 7/2008 | Budianu et al. | |
| 2009/0054999 A1* | 2/2009 | Batruni .................. | G05B 17/02 |
| | | | 703/2 |
| 2009/0082017 A1 | 3/2009 | Chang et al. | |
| 2010/0303451 A1 | 12/2010 | Nakabayashi | |
| 2012/0076234 A1 | 3/2012 | Kim et al. | |
| 2012/0176966 A1 | 7/2012 | Ling | |
| 2012/0252372 A1 | 10/2012 | Kihara et al. | |
| 2013/0006601 A1 | 1/2013 | Mlinarsky et al. | |
| 2013/0022128 A1 | 1/2013 | Symes | |
| 2013/0042143 A1 | 2/2013 | Melzer et al. | |
| 2014/0195779 A1 | 7/2014 | Nicol et al. | |
| 2014/0307760 A1 | 10/2014 | Sorrells et al. | |
| 2015/0098535 A1 | 4/2015 | Wu et al. | |
| 2015/0289292 A1* | 10/2015 | Sun ...................... | H04L 27/2613 |
| | | | 370/329 |
| 2015/0349725 A1 | 12/2015 | Hirai et al. | |
| 2016/0028514 A1 | 1/2016 | Venkataraghavan et al. | |
| 2018/0059215 A1 | 3/2018 | Turbiner et al. | |
| 2018/0059218 A1 | 3/2018 | Buettgen et al. | |
| 2018/0152330 A1 | 5/2018 | Chritz et al. | |
| 2018/0227158 A1 | 8/2018 | Luo et al. | |
| 2018/0255552 A1 | 9/2018 | Luo et al. | |
| 2018/0285715 A1 | 10/2018 | Son et al. | |
| 2018/0322388 A1 | 11/2018 | O'Shea | |
| 2018/0324021 A1 | 11/2018 | Chritz et al. | |
| 2019/0280900 A1* | 9/2019 | Kurras ................. | H04L 5/0007 |
| 2019/0326924 A1 | 10/2019 | Tanio | |
| 2020/0036567 A1 | 1/2020 | Chritz et al. | |
| 2020/0044905 A1 | 2/2020 | Luo et al. | |
| 2020/0073636 A1 | 3/2020 | Cammarota et al. | |
| 2020/0274608 A1 | 8/2020 | Luo et al. | |
| 2020/0327185 A1 | 10/2020 | Xu | |
| 2021/0119690 A1 | 4/2021 | Luo et al. | |
| 2021/0143860 A1 | 5/2021 | Luo | |
| 2021/0367822 A1 | 11/2021 | Chritz et al. | |
| 2021/0367823 A1 | 11/2021 | Luo et al. | |
| 2022/0140850 A1 | 5/2022 | Luo | |
| 2023/0113600 A1 | 4/2023 | Luo | |
| 2023/0115877 A1 | 4/2023 | Luo et al. | |
| 2023/0261915 A1 | 8/2023 | Luo et al. | |

FOREIGN PATENT DOCUMENTS

| | | |
|---|---|---|
| CN | 1900927 A | 1/2007 |
| CN | 101175061 A | 5/2008 |
| CN | 101243423 A | 8/2008 |
| CN | 101578836 A | 11/2009 |
| CN | 101652947 A | 2/2010 |
| CN | 102474489 A | 5/2012 |
| CN | 202218240 U | 5/2012 |
| CN | 102541015 A | 7/2012 |
| CN | 102665229 A | 9/2012 |
| CN | 102739832 A | 10/2012 |
| CN | 108694692 A | 10/2018 |
| CN | 109754790 A | 5/2019 |
| CN | 110024345 A | 7/2019 |
| CN | 110036611 A | 7/2019 |
| CN | 110383720 A | 10/2019 |
| EP | 2374251 B1 | 6/2015 |
| JP | 2005236852 A | 9/2005 |
| JP | 4331580 B2 | 6/2009 |
| JP | 2017016384 A | 1/2017 |
| WO | 02058290 A1 | 7/2002 |
| WO | 2006052501 A1 | 5/2006 |
| WO | 2018101994 A1 | 6/2018 |
| WO | 2018101997 A1 | 6/2018 |
| WO | 2020172060 A1 | 2/2020 |
| WO | 2021096640 A1 | 5/2021 |

OTHER PUBLICATIONS

U.S. Appl. No. 17/394,597 titled "Wireless Devices and Systems Including Examples of Mixing Input Data With Coefficient Data" filed Aug. 5, 2021, pp. all pages of application as filed.

U.S. Appl. No. 16/594,550 titled "Wireless Devices and Systems Including Examples of Mixing Input Data With Coefficient Data" filed Oct. 7, 2019, pp. all pages of application as filed.

U.S. Appl. No. 16/594,503 titled "Wireless Devices and Systems Including Examples of Mixing Coefficient Data Specific to a Processing Mode Selection" filed Oct. 7, 2019, pp. all pages of application as filed.

U.S. Appl. No. 17/150,016 titled "Mixing Coefficient Data for

(56) References Cited

OTHER PUBLICATIONS

Processing Mode Selection" filed Jan. 15, 2021, pp. all pages of application as filed.
EESR dated Jul. 27, 2020 for EP Application No. 17876576.4, 9 pgs.
EN translation of CN Office Action dated May 8, 2021 for CN Application No. 201780073768.3; pp. all.
EP Office Action dated Jan. 4, 2022 for EP Appl. No. 17876576.4; pp. all.
International Search Report and Written Opinion dated Dec. 5, 2017 for PCT Application No. PCT/US2017/048745, pp. all.
U.S. Appl. No. 18/053,310 titled, "Mixing Coefficient Data for Processing Mode Selection," filed on Nov. 7, 2022, pp. all pages of application as filed.
U.S. Appl. No. 18/136,919, filed Apr. 20, 2023, titled, "Mixing Coefficient Data Specific To A Processing Mode Selection Using Layers of Multiplication/Accumulation Units For Wireless Communication,", pp. all pages of application as filed.
U.S. Appl. No. 18/300,991, titled "Wireless Devices and Systems Including Examples of Mixing Input Data Withcoefficient Data" filed Apr. 14, 2023, pp. all pages of application as filed.
U.S. Appl. No. 16/683,223, titled "Mixing Coefficient Data For Processing Mode Selection", filed Nov. 13, 2019, pp. all pages of application as filed.
U.S. Appl. No. 15/365,397 entitled "Wireless Devices and Systems Including Examples of Mixing Coefficient Data Specific to a Processing Mode Selection", filed Nov. 30, 2016, pp. all pages of application as filed.
U.S. Appl. No. 15/941,532 titled "Wireless Devices and Systems Including Examples of Mixing Coefficient Data Specific To a Processing Mode Selection", filed Mar. 30, 2018, pp. all pages of application as filed.
U.S. Appl. No. 16/034,751 titled "Wireless Devices and Systems Including Examples of Mixing Input Data With Coefficient Data" filed Jul. 13, 2018, pp. all pages of application as filed.
U.S. Appl. No. 16/282,916 titled "Mixing Coefficient Data Specific to a Processing Mode Selection Using Layers of Multiplication/Accumulation Units for Wireless Communication" filed Feb. 22, 2019, pp. all pages of application as filed.
U.S. Appl. No. 17/138,299, titled "Mixing Coefficient Data Specific to a Processing Mode Selection Using Layers of Multiplication/Accumulation Units for Wireless Communication", filed Dec. 30, 2020, pp. all pages of application as filed.
U.S. Appl. No. 15/365,326 entitled "Wireless Devices and Systems Including Examples of Mixing Input Data With Coefficient Data", filed Nov. 30, 2016, pp. all pages of application as filed.
Helmschmidt, Jurgen et al., "Reconfigurable Signal Processing in Wireless Terminals", Proceedings of the Design, Automation and Test in Europe Conference and Exhibition, IEEE Computer Society, Mar. 2003, 6 pgs.
Helmschmidt, Jurgen et al., "Reconfigurable Signal Processing in Wireless Terminals [Mobile Applications]", Design, Automation and Test in Europe Conference and Exhibition, Conference Paper, Feb. 2003, pp. all.
Luo, et al., Signal Processing for 5G: Algorithms and Implementations, IEEE—Wiley; Oct. 2016, pp. 431-455.
Rauwerda, Gerald et al., "Towards Softward Defined Radios Using Coarse-Grained Reconfigurable Hardware", IEEE Transactions on Very Large Scale Integration Systems, vol. 16, No. 1, Jan. 2008, 11 pgs.
Shixian, Wang , "Research on Digital Signal Processor Architecture Technology for Cognitive Radio", China PhD Dissertation Full Text Database (Electronic Journal) Information Science and Technology Series, Oct. 31, 2014.
Ma, Yongtao , "Research on the Neural Networks Optimization Technique for Communication Channel Modeling", Full text Database of Chinese Doctoral Dissertations: www.cnki.net; Dec. 2010.
Vinutha, C.B. , et al., "Energy Efficient Wireless Sensor Network Using Neural Network Based Smart Sampling and Reliable Routing Protocol", IEEE: International Conference on Wireless Communications, Signal Processing and Networking, Mar. 2017, 5 pgs.
Wang, Youjun , "Signal Recognition Technology Based Neural Network in Wireless Communications", Institution of Information Engineering: University of Chinese Academy of Sciences, Jun. 2018, 73 pgs.

\* cited by examiner

WIRELESS DEVICES AND SYSTEMS INCLUDING EXAMPLES OF MIXING COEFFICIENT DATA SPECIFIC TO A PROCESSING MODE SELECTION

CROSS REFERENCE TO RELATED APPLICATION(S)

This application is a continuation of U.S. patent application Ser. No. 17/394,601 on Aug. 5, 2021 and issued as U.S. Pat. No. 11,695,503 on Jul. 4, 2023, which is a continuation of U.S. patent application Ser. No. 16/594,503 filed Oct. 7, 2019 and issued as U.S. Pat. No. 11,088,888 on Aug. 10, 2021, which is a continuation of U.S. patent Ser. No. 15/941,532 filed Mar. 30, 2018 and issued as U.S. Pat. No. 10,484,225 on Nov. 19, 2019, which is a continuation of U.S. patent application Ser. No. 15/365,397 filed Nov. 30, 2016 and issued as U.S. Pat. No. 9,942,074 on Apr. 10, 2018. The aforementioned applications, and issued patents, are incorporated herein by reference, in its entirety, for any purpose.

BACKGROUND

Digital signal processing for wireless communications, such as digital baseband processing or digital front-end implementations, can be implemented using some hardware (e.g. silicon) computing platforms. For example, multimedia processing and digital radio frequency (RF) processing may be accomplished in a digital front-end implementation of a wireless transceiver, as implemented by an application-specific integrated circuit (ASIC). A variety of hardware platforms can implement such digital signal processing, such as the ASIC, a digital signal processor (DSP) implemented as part of a field-programmable gate array (FPGA), or a system-on-chip (SoC). However, each of these solutions often requires implementing customized signal processing methods that are hardware implementation specific. For example, a digital signal processor can implement a turbocoding application for data in a customized design of an FPGA.

Moreover, there is interest in moving wireless communications to "fifth generation" (5G) systems. 5G offers promise of increased speed and ubiquity, but methodologies for processing 5G wireless communications have not yet been set.

DETAILED DESCRIPTION

Figure 1:
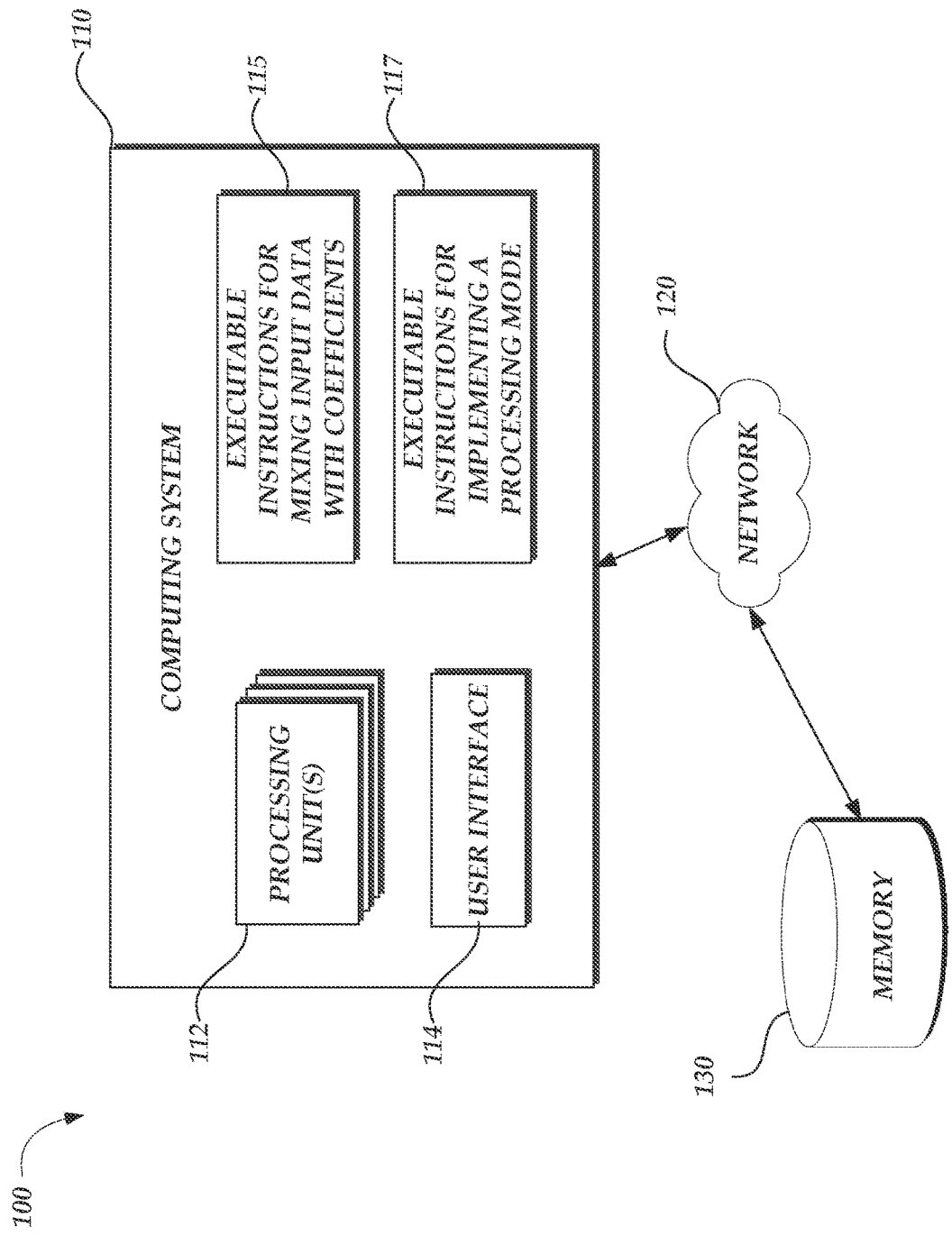
FIG. 1 is a schematic illustration of a computing system arranged in accordance with examples described herein.

Certain details are set forth below to provide a sufficient understanding of embodiments of the invention. However, it will be clear to one skilled in the art that embodiments of the invention may be practiced without various of these particular details. In some instances, well-known wireless communication components, circuits, control signals, timing protocols, computing system components, and software operations have not been shown in detail in order to avoid unnecessarily obscuring the described embodiments of the invention.

There is interest in moving wireless communications to "fifth generation" (5G) systems. 5G offers promise of increased speed and ubiquity, but methodologies for processing 5G wireless communications have not yet been set. The lead time in designing and processing a hardware platform for wireless communications can be significant. Accordingly, it may be advantageous in some examples to design and/or process a hardware platform for 5G wireless communication that may process wireless communications using a configurable algorithm—in this manner the algorithm utilized by the hardware platform may not need to be decided until after the platform is designed and/or fabricated.

Examples described herein include systems and methods which include wireless devices and systems with examples of mixing input data with coefficient data. The input data may be any data that is input for digital signal processing. The coefficient data may be any data that is specific to a wireless protocol. Examples of wireless protocols include, but are not limited to a 5G wireless system utilizing a wireless protocol such as filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. Generally, any wireless protocol including any 5G wireless protocol may be represented by coefficient data as disclosed herein. The input data may be mixed with the coefficient data to generate output data. For example, a computing system with processing units may mix the input data for a transmission in a radio frequency (RF) wireless domain with the coefficient data to generate output data that is representative of the transmission being processed according to the wireless protocol in the RF wireless domain. In some examples, the computing system generates an approximation of output data. For example, the output data may be an approximation of output data generated when input data is processed in hardware (e.g., an FPGA) specifically-designed to implement the wireless protocol that the coefficients correspond to.

While the above example of mixing input data with coefficient data has described in terms of an RF wireless domain, it can be appreciated that wireless communication data may be processed from the perspective of different domains, such as a time domain (e.g., time-division multiple access (TDMA)), a frequency domain (e.g., orthogonal frequency-division multiple access (OFDMA), and/or a code domain (e.g., code-division multiple access (CDMA)).

Advantageously in some examples, the systems and methods described herein may operate according to multiple standards and/or with multiple applications, including changes or upgrades to each thereto; in contrast to the inflexible framework of an ASIC-based solution. In some examples, as discussed herein in terms of processing units implementing multiplication, addition, or accumulation functionalities, examples of the systems and methods described herein may operate on a power-efficient framework, consuming minimal power with such functionalities; in contrast to a power-hungry framework of a FPGA/DSP-based solution. In some examples, systems and methods described herein may operate with a substantially integrated framework from a unified programming language perspective; in contrast to the various programming languages needed for integration of a SoC solution that may can pose programming challenges when implementing heterogeneous interfaces for control units, computational units, data units and accelerator units.

Examples described herein include systems and methods which include wireless transmitters and receivers with examples of mixing input data with coefficient data. For example, the digital signal processing aspects of a wireless transmitter may be implemented by mixing input data with coefficient data, as described herein. In this manner, a computing system can output data that is representative of operations of an RF front-end to modulate the input data for a RF wireless transmission. In some examples, the coefficient data can be mixed with the input data to represent certain operations, such as: block coding the input data; interleaving the block coded input data; mapping the block coded data that was interleaved according to a modulation mapping to generate modulated input data; converting the modulated input data to a frequency domain with an inverse fast Fourier transform (IFFT); and mixing the modulated input data that was converted to the frequency domain using a carrier signal, which, in turn, generates output data. A wireless transmitter and/or wireless receiver may be referred to herein as a wireless transceiver.

Examples described herein include systems and methods for training a computing device with coefficient data. In some examples, a wireless transmitter may receive the input associated with a RF wireless transmission. The wireless transmitter may perform operations as an RF front-end, such as modulating the input data for a RF wireless transmission. The output data that is generated by the wireless transmitter may be compared to the input data to generate coefficient data. A computing device that receives and compares that output data, along with other corresponding input data and corresponding, subsequent output data, may be trained to generate coefficient data based on the operations of a specifically-designed wireless transmitter such that mixing arbitrary input data using the coefficient data generates an approximation of the output data, as if it were processed by the specifically-designed wireless transmitter. The coefficient data can also be stored in a coefficient database, with each set of coefficient data corresponding to a wireless protocol that may be utilized in the RF domain for a data transmission.

In some examples, the computing device may receive a processing mode selection, for example, a processing mode selection from a user interacting with the computing system. A processing mode selection can indicate a specific processing mode for the computing system. As described further below, a processing mode may correspond to a single processing mode, a multi-processing mode, or a full processing mode. As an example, a full processing mode may be a processing mode representative of a wireless transmitter (e.g., a wireless transmitter processing mode) or a processing mode representative of a wireless receiver (e.g., a wireless receiver processing mode). For example, a wireless transmitter mode may comprise the operation of an RF front-end. Accordingly, a computing device can provide output data that is representative of the data transmission being processed according to a wireless transmitter mode, when such a processing mode selection is received by the computing device.

Generally, any aspect of a wireless protocol can be used to generate coefficient data, which, in turn, may be utilized to mix input data to generate output data that is representative of that aspect of the wireless protocol being processed in hardware that implements that aspect of the wireless protocol. For example, an FPGA may be used to process an IFFT for various data transmissions to be transmitted according to a wireless protocol that incorporates an IFFT. As disclosed herein, a computing system mixing input data with coefficient data specific to an IFFT operation may be utilized to generate output data that is representative of the IFFT, as if the input data were processed in the aforementioned FPGA configured to process an IFFT. In some examples, the computing system advantageously performs in more versatile setting than an FPGA processing an IFFT. An FPGA implementing an IFFT may be a pre-designed hardware unit that is optimized to perform at a specific setting for the IFFT, for example, a 256-point IFFT setting. Accordingly, the FPGA that is designed for a 256-point IFFT is limited to performing optimally for wireless protocols that specify 256-point IFFTs. However, if a specific implementation of a wireless protocol specifies that a 512-point FFT is to be performed by the FPGA, the FPGA may not perform optimally in that setting. Using examples of the systems and methods described herein, a computing system may advantageously be configured to operate as a 256-point IFFT or a 512-point IFFT, depending on system or user input (e.g., a processing mode selection), thereby allowing the computing system to perform optimally in more settings than an FPGA configured to implement a specific type of IFFT.

While some examples herein have been described in terms of an IFFT, it can be appreciated that various aspects of a wireless protocol can be processed by mixing input data with coefficient data to generate output data representative of that aspect. For example, other aspects of wireless protocols that can be implemented with coefficient data being mixed with input data include, but are not limited to: baseband processing of a wireless transmitter, baseband processing of a wireless receiver, processing of a digital front-end transmitter (e.g., a digital RF transistor), analog-to-digital conversion (ADC) processing, digital-to-analog (DAC) conversion processing, digital up conversion (DUC), digital down conversion (DDC), direct digital synthesizer (DDS) processing, DDC with DC offset compensation, digital pre-distortion (DPD), peak-to-average power ratio (PAPR) determinations, crest factor reduction (CFR) determinations, pulse-shaping, image rejection, delay/gain/imbalance compensation, noise-shaping, numerical controlled oscillator (NCO), self-interference cancellation (SIC), any modulation algorithm, any error-correction coding or decoding algorithm, channel estimation, any pre-coding algorithm, and combinations thereof.

FIG. 1 is a schematic illustration of a computing system 110 arranged in a system 100 in accordance with examples described herein. The computing system 110 is coupled to a memory 130 that may store coefficient data. The computing system 110 may be coupled to the memory 130 via the network 120, for example, or other electrical connection. The coefficient data stored in the memory 130 may include coefficient data which may be mixed with input data received by the computing system 110 in examples described herein. Computing system 110 also includes processing units 112 that may interact with computer readable media 115, 117, both of which may be encoded with instructions executable by the processing unit(s) 112. The term computer readable media as used herein may include both storage media and communication media. Example computer readable media may include volatile and nonvolatile, removable and non-removable media implemented in any method or technology for storage of information, such as computer readable instructions.

The processing unit(s) 112 may be implemented using one or more processors, for example, having any number of cores. In some examples, the processing unit(s) 112 may include circuitry, including custom circuitry, and/or firmware for performing functions described herein. For example, circuitry can include multiplication unit/accumulation units for performing the described functions, as described herein. Processing unit(s) 112 can be any type including but not limited to a microprocessor or a digital signal processor (DSP), or any combination thereof. For example, processing unit(s) 112 can include levels of caching, such as a level one cache and a level two cache, a core, and registers. An example processor core can include an arithmetic logic unit (ALU), a bit manipulation unit, a multiplication unit, an accumulation unit, an adder unit, a look-up table unit, a memory look-up unit, or any combination thereof. Examples of processing unit 112 are described herein, for example with reference to FIG. 2.

The computer readable media 115, for example, may be encoded with executable instructions for mixing input data with coefficient data. For example, in the context of a 5G wireless transmission system, the executable instructions for mixing input data with coefficient data may include instructions for providing, to the antenna, output data that is representative of the input data being processed according to the wireless protocol for that 5G wireless transmission. The executable instructions for mixing input data with coefficient data may further include instructions for multiplying a portion of the input data with coefficient data to generate a coefficient multiplication result and accumulating the coefficient multiplication result to be further multiplied and accumulated with other input data and coefficient data, examples of which are described herein.

The computer readable media 117, for example, may be encoded with executable instructions for implementing a processing mode. A processing mode selection may cause the computing system 110 to receive input data for a transmission based on the processing mode selection. Generally, the computing system 110 may process input data according to a variety of processing modes. In an example, a multi-processing mode may include at least two aspects of a wireless protocol, whereas a single processing mode includes one aspect of a wireless protocol. Aspects of a wireless protocol may include, among other aspects: fast Fourier transform (FFT) processing, inverse fast Fourier transform (IFFT) processing, turbocoding, Reed Solomon processing, decoding, interleaving, deinterleaving, modulation mapping, demodulation mapping, scrambling, descrambling, or channel estimation. In some examples, the output data may be formatted such that the output data may be received by another wireless processing unit for further processing. For example, a computing system may operate in single-processing mode as a turbocoding operation to output coded data. That coded data may be formatted to be received by another wireless processing unit such as interleaving that may be processed differently by the computing system or by another computing system (e.g., a cloud computing system). A processing mode selection may be received via the user interface 114. In some examples, the processing mode selection may be received by decoding and/or examining some portion of incoming input data. For example, the computing system 110 may recognize that the input data is intended for processing using a particular processing mode, e.g. by recognition of a pattern or other signature indicative of that processing mode in the input data.

The user interface 114 may be implemented with any of a number of input devices including, but not limited to, a touchscreen, keyboard, mouse, microphone, or combinations thereof. The user interface 114 may receive input from a user, for example, regarding a processing mode selection to specify a processing mode for the processing unit(s) 112. The user interface 114 may communicate the user input to the computer readable media 115, 117 for processing of the user input. Example user interfaces 114 include a serial interface controller or a parallel interface controller, which may be configured to communicate with external input devices (e.g., keyboard, mouse, pen, voice input device, touch input device, etc.).

The network 120 may include a wired network or direct-wired connection, and wireless media such as acoustic, radio frequency (RF), microwave, infrared (IR) and other wireless media.

The memory 130 may be implemented using any storage medium accessible to the processing unit(s) 112. For example, RAM, ROM, solid state memory, flash memory, disk drives, system memory, optical storage, or combinations thereof, may be used to implement memory 130. The memory 130 may store associations between coefficients and wireless protocols and/or processing modes described herein.

The computing system 110 may be implemented using any of a variety of computing systems, including but not limited to one or more desktop, server, laptop, or other computers. The computing system 110 generally includes one or more processing unit(s) 112. The computing system 100 may be implemented as a mobile communication device using any user communication device, including but not limited to, a desktop, laptop, cellular phone, tablet, appliance, automobile, or combinations thereof. The computing system 110 may be programmed with a mobile application (e.g. processing unit(s) 112 and computer readable media encoded with instructions which, when executed, cause the computing system 110 to perform described functions) for mixing input data with coefficient data or specifying a processing mode. For example, the computing system 110 may be programmed to receive an indication from a touchscreen of a mobile communication device that a multi-processing mode is to be utilized for data received via a 5G wireless data transmission.

It is to be understood that the arrangement of computing systems of the system 100 may be quite flexible, and although not shown, it is to be understood that the system 100 may include many computing systems 110, which may be connected via the network 120 can operate in conjunction with each other to perform the systems and methods described herein. The computer readable media 115 and the memory 130 may in some examples be implemented using the same media, and in other examples may be implemented using different media. For example, while the memory 130 is shown in FIG. 1 as coupled to the network 120, it can be appreciated that the memory 130 may also be implemented in the computing system 110. Additionally, while a single user interface 114 is shown in FIG. 1, it can be appreciated that the computing system 110 may further include any number of input devices, output devices, and/or peripheral components. For example, the user interface 114 may be the interface of a mobile communication device.

Figure 2:
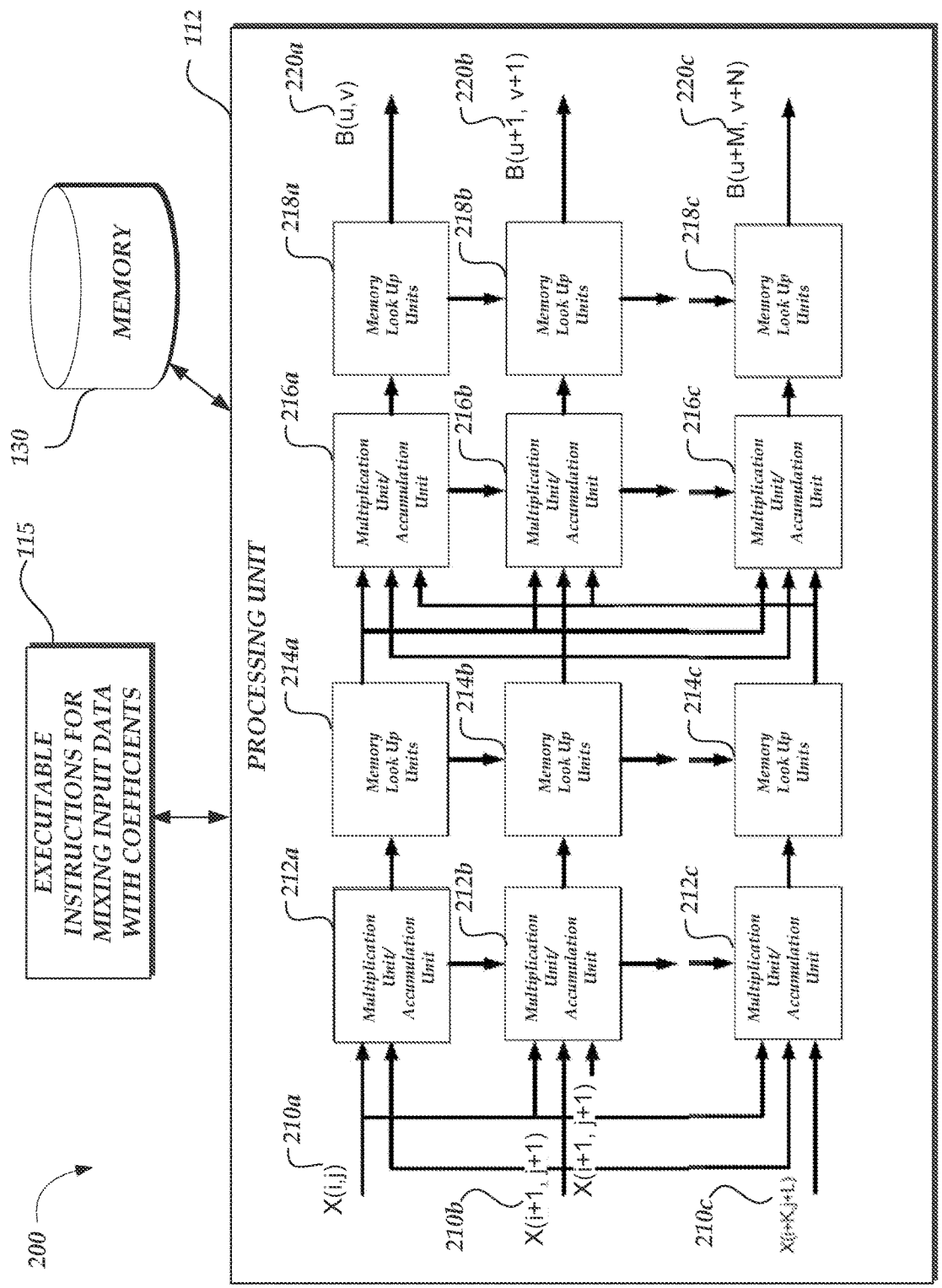
FIG. 2 is a schematic illustration of a computing system arranged in accordance with the example of FIG. 1.

FIG. 2 is a schematic illustration of a processing unit 112 arranged in a system 200 in accordance with examples described herein. The processing unit 112 may receive input data (e.g. X (i,j)) 210a-c from the computing system, as implemented by the computer readable media 115 executing instructions 115. The processing unit 212 may include multiplication unit/accumulation units 212a-c, 216a-c and memory look-up units 214a-c. 218a-c that, when instructions 115 are executed, may generate output data (e.g. B (u,v)) 220a-c. The multiplication unit/accumulation units 212a-c, 216a-c multiply two operands from the input data 210a-c to generate a multiplication processing result that is accumulated by the accumulation unit portion of the multiplication unit/accumulation units 212a-c, 216a-c. The multiplication unit/accumulation units 212a-c, 216a-c adds the multiplication processing result to update the processing result stored in the accumulation unit portion, thereby accumulating the multiplication processing result. For example, the multiplication unit/accumulation units 212a-c, 216a c may perform a multiply-accumulate operation such that two operands, A and B, are multiplied and then added with C to generate a new version of C that is stored in its respective multiplication unit/accumulation units. The memory look-up units 214a-c, 218a-c retrieve coefficient data stored in memory 130. For example, the memory look-up unit can be a table look-up that retrieves a specific coefficient. The output of the memory look-up units 214a-c, 218a-c is provided to the multiplication unit/accumulation units 212a-c, 216a c that may be utilized as a multiplication operand in the multiplication unit portion of the multiplication unit/accumulation units 212a-c, 216a-c. In some examples, instructions 117 may be executed to facilitate selection of a specific processing mode for the processing unit 112. Using such a circuitry arrangement, the output data (e.g. B (u,v)) 220a-c may be generated from the input data (e.g. X (i,j)) 210a-c.

In some examples, coefficient data, for example from memory 130, can be mixed with the input data X (i,j) 210a-c to generate the output data B (u,v) 220a-c. The relationship of the coefficient data to the output data B (u,v) 220a-c based on the input data X (i,j) 210a-c may be expressed as:

$$B(u, v) = f\left(\sum_{m,n}^{M,N} a''_{m,n} f\left(\sum_{k,l}^{K,L} a'_{k,l} X(i+k, j+l)\right)\right) \quad (1)$$

where $a_{k,l}'$, $a_{m,n}''$ are coefficients for the first set of multiplication/accumulation units 212a-c and second set of multiplication/accumulation units 216a-c, respectively, and where f(∩) stands for the mapping relationship performed by the memory look-up units 214a-c, 218a-c. As described above, the memory look-up units 214a-c, 218a c retrieve coefficients to mix with the input data. Accordingly, the output data may be provided by manipulating the input data with multiplication/accumulation units using a set of coefficients stored in the memory associated with a desired wireless protocol. The resulting mapped data may be manipulated by additional multiplication/accumulation units using additional sets of coefficients stored in the memory associated with the desired wireless protocol. The sets of coefficients multiplied at each stage of the processing unit 112 may represent or provide an estimation of the processing of the input data according to the wireless protocol in specifically-designed hardware (e.g., an FPGA). Further, it can be shown that the system 200, as represented by Equation 5, may approximate any nonlinear mapping with arbitrarily small error in some examples and the mapping of system 200 is determined by the coefficients $a_{k,l}'$, $a_{m,n}''$. For example, if such coefficient data is specified, any mapping and processing between the input data X (i,j) 210a-c and the output data B (u,v) 220a-c may be accomplished by the system 200. Such a relationship, as derived from the circuitry arrangement depicted in system 200, may be used to train a computing device 110 to generate coefficient data. For example, using Equation (1), the computing device 110 may compare input data to the output data to generate the coefficient data.

In the example of system 200, the processing unit 112 mixes the coefficient data with the input data X (i,j) 210a-c utilizing the memory look-up units 214a-c, 218a-c. In some examples, the memory look-up units 214a-c, 218a-c can be referred to as table look-up units. The coefficient data may be associated with a mapping relationship for the input data X (i,j) 210a-c to the output data B (u,v) 220a-c. For example, the coefficient data may represent non-linear mappings of the input data X (i,j) 210a-c to the output data B (u,v) 220a-c. In some examples, the non-linear mappings of the coefficient data may represent a Gaussian function, a piece-wise linear function, a sigmoid function, a thin-plate-spline function, a multiquadratic function, a cubic approximation, an inverse multi-quadratic function, or combinations thereof. In some examples, some or all of the memory look-up units 214a-c, 218a-c may be deactivated. For example, one or more of the memory look-up units 214a-c, 218a-c may operate as a gain unit with the unity gain. In such a case, the instructions 117 may be executed to facilitate selection of a unity gain processing mode for some or all of the memory look up units 214a-c, 218a-c.

In some examples, the instructions 115 are executed to determine whether some of the coefficient data is identical. In such a case, the instructions 117 may be executed to facilitate selection of a single memory look-up unit for identical coefficients. For example, if the coefficient data to be retrieved by the memory look-up units 214a and 214b are identical, then a single memory look-up unit 214 could replace the memory look-up units 214a and 214b. Continuing in the example, the instructions 117 may be further executed to configure memory look-up unit 214a to receive input from both multiplication unit/accumulation unit 212a and multiplication unit/accumulation unit 212b, at different times or at the same time.

Each of the multiplication unit/accumulation units 212a-c, 216a-c may include multiple multipliers, multiple accumulation unit, or and/or multiple adders. Any one of the multiplication unit/accumulation units 212a-c, 216a may be implemented using an ALU. In some examples, any one of the multiplication unit/accumulation units 212a-c, 216a-c can include one multiplier and one adder that each perform, respectively, multiple multiplications and multiple additions. The input-output relationship of a multiplication/accumulation unit 212, 216 may be represented as:

$$B_{out} = \sum_{i=1}^{I} C_i * B_{in}(i) \quad (2)$$

where "I" represents a number to perform the multiplications in that unit, $C_i$ the coefficients which may be accessed from a memory, such as coefficient data memory 130, and $B_{in}(i)$ represents a factor from either the input data X (i,j) 210a-c or an output from multiplication unit/accumulation units 212a-c, 216a-c. In an example, the output of a set of multiplication unit/accumulation units, $B_{out}$, equals the sum of coefficient data, $C_i$ multiplied by the output of another set of multiplication unit/accumulation units, $B_{in}(i)$. In the example, $B_{in}(i)$ may also be the input data such that the output of a set of multiplication unit/accumulation units, $B_{out}$, equals the sum of coefficient data, $C_i$ multiplied by input data.

In some examples where the processing unit 112 is implemented to provide data in accordance with a wireless protocol with input data to be transmitted in a transmission according to the wireless protocol, the output data B (u,v) 220a-c may be derived from the inputs of the system 200, in the following manner. The input data X (i,j) 210a-c may be represented as symbols to be modulated and to generate output data B (u,v) 220a-c for a DAC, thereby formatting the output data for transmission by an antenna (e.g., an RF antenna). In some examples, the inputs 210a-c may be expressed as:

$$x(n) = \sum_{k=0}^{K-1} d(k, m) e^{-j2\pi \frac{kn}{N}} \quad (3)$$

$$x(n) = \sum_{m=0}^{M=1} \sum_{k=0}^{K-1} d(k, m) g[n] * \delta[n - mN] e^{-j2\pi \frac{kn}{N}} \quad (4)$$

where n is the time index, k is the sub-carrier index, m is the time-symbol index, M is the number of symbols per sub-carrier, K is the number of active sub-carriers and N is the total number of sub-carriers (e.g., the length of Discrete Fourier Transform (DFT)), x(n) is the input data X (i,j) 210a-c, n] are the shaping filter coefficients and d (k,m) is the coded data related to m'th symbol. In some examples where the system 200 implements OFDM, Equation 3 may be further generalized to:

$$x(n) = \sum_{k=0}^{K-1} d(k, m) * g_k(n) \quad (5)$$

where $g_k(n)$ is the impulse response of the k'th filter. Accordingly, a filter with a rectangular impulse response can represent the input data X (i,j) 210a-c. And Equation 5 may also be expressed as:

$$x(n) = \sum_{b=0}^{B-1} \sum_{k=0}^{K_b-1} d(k, m) * g_k(b, n) \quad (6)$$

where B is the number of sub-bands, $K_b$ is the number of subcarriers in b'th sub-band, $g_k(b, n)$ is the impulse response of the corresponding k'th filter in b'th sub-band.

Figure 3:
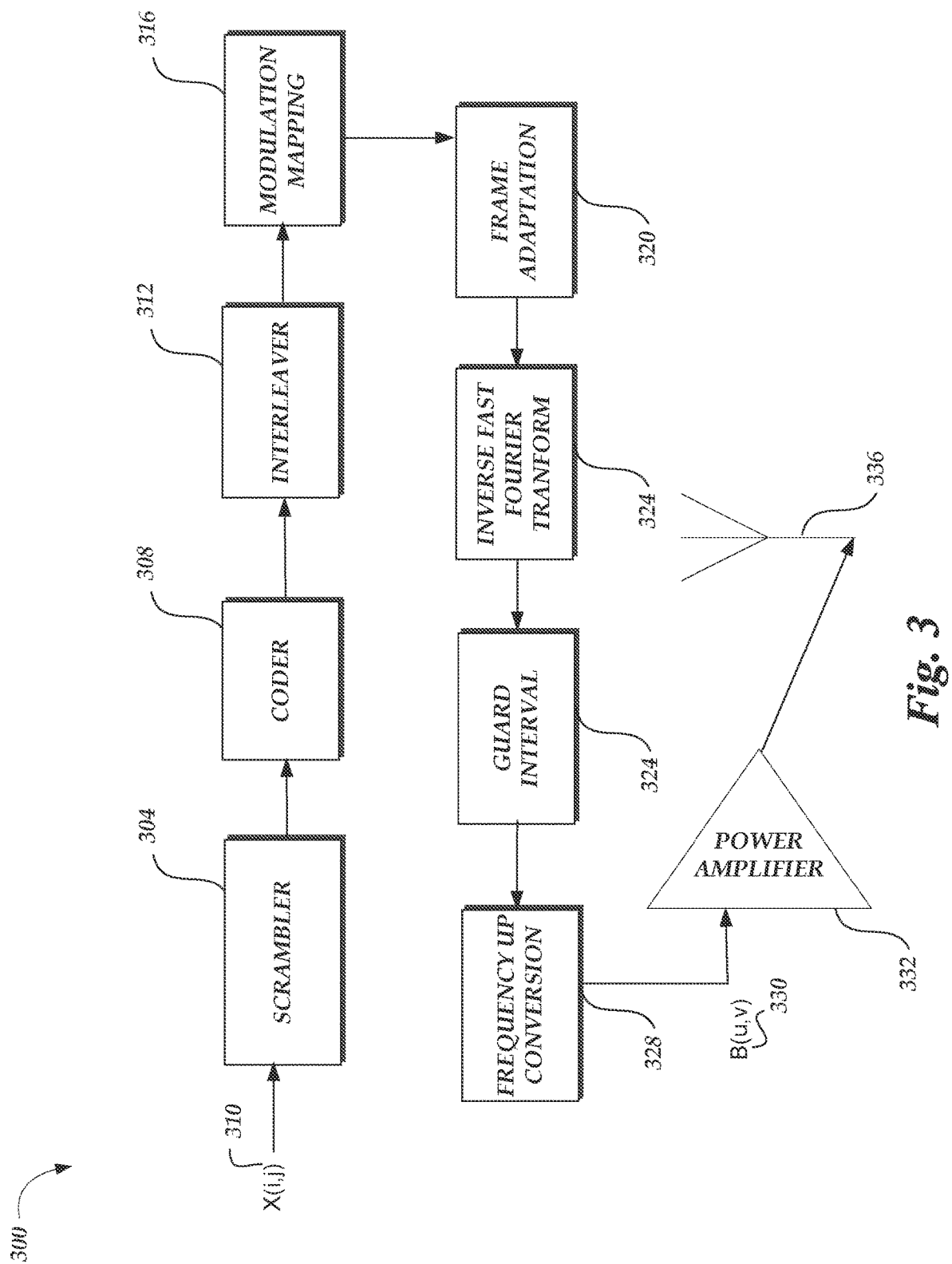
FIG. 3 is a schematic illustration of a wireless transmitter.

FIG. 3 is a schematic illustration of a wireless transmitter 300. The wireless transmitter 300 receives input data X (i,j) 310 and performs operations of an RF-front end to generate output data B (u,v) 330 for wireless transmission. The output data B (u,v) 330 is amplified by a power amplifier 332 before that output data is transmitted on an RF antenna 336. The operations of the RF-front end may generally be performed with analog circuitry or processed as a digital baseband operation for implementation of a digital front-end. The operations of the RF-front end include a scrambler 304, a coder 308, an interleaver 312, a modulation mapping 316, a frame adaptation 320, an IFFT 324, a guard interval 324, and frequency up conversion 328.

The scrambler 304 converts the input data to a pseudo-random or random binary sequence. For example, the input data can be a transport layer source (such as MPEG-2 Transport stream and other data) that is converted to a Pseudo Random Binary Sequence (PRBS) with a generator polynomial. While described in the example of a generator polynomial, various scramblers 304 are possible. The coder 308 may encode the data outputted from the scrambler to code the data. For example, a Reed-Solomon (RS) encoder or turbo encoder may be used as outer coder to generate a parity block for each randomized transport packet fed by the scrambler 304. In some examples, the length of parity block and the transport packet can vary according to various wireless protocols. The interleaver 312 may interleave the parity blocks output by the coder 308, for example, the interleaver 312 may utilize convolutional byte interleaving. In some examples, additional coding and interleaving can be performed after the coder 308 and interleaver 312. For example, additional coding may include an inner coder that may further code data output from the interleaver, for example, with a punctured convolutional coding having a certain constraint length Additional interleaving may include an inner interleaver that forms groups of joined blocks. While described in the context of a RS coding, turbocoding, and punctured convolution coding, various coders 308 are possible. While described in the context of convolutional byte interleaving, various interleavers 312 are possible.

The modulation mapping 316 modulates the data outputted from the interleaver 312. For example, quadrature amplitude modulation (QAM) can map the data by changing (e.g., modulating) the amplitude of the related carriers. Various modulation mappings can are possible, including, but not limited to: Quadrature Phase Shift Keying (QPSK), SCMA NOMA, and MUSA (Multi-user Shared Access). Output from the modulation mapping 316 may be referred to as data symbols. While described in the context of QAM modulation, various modulation mappings 316 are possible. The frame adaptation 320 may arrange the output from the modulation mapping according to bit sequences that represent corresponding modulation symbols, carriers, and frames.

The IFFT 324 may transform symbols that have been framed into sub-carriers (e.g., by frame adaptation 320) into time-domain symbols. For example, taking an example of an OFDM wireless protocol scheme, the IFFT can be applied as N-point IFFT:

$$x_k = \sum_{n=1}^{N} X_n e^{j2\pi kn/N} \quad (7)$$

where $X_n$ is the modulated symbol sent in the nth OFDM sub-carrier. Accordingly, the output of the IFFT 324 may form time-domain OFDM symbols. In some examples, the IFFT 324 may be replaced by a pulse shaping filter or poly-phase filtering banks to output symbols for frequency-up conversion 328. The guard interval 324 adds a guard interval to the time-domain OFDM symbols. For example, the guard interval may be a fractional length of a symbol duration that is added, to reduce inter-symbol interference, by repeating a portion of the end of a time-domain OFDM symbol at the beginning of the frame. For example, the guard interval can be a time period corresponding to the cyclic prefix portion of the OFDM wireless protocol scheme. The frequency up conversion 328 may up convert the time-domain OFDM symbols to a specific radio frequency. For example, the time-domain OFDM symbols can be viewed as a baseband frequency range and a local oscillator can mix the frequency at which it oscillates with the OFDM symbols to generate OFDM symbols at the oscillation frequency. Accordingly, the OFDM symbols can be up-converted to a specific radio frequency for an RF transmission. The power amplifier 332 may amplify the output B (u,v) 330 to output data for an RF transmission in an RF domain at the antenna 336. The antenna 336 may be an antenna designed to radiate at a specific radio frequency. For example, the antenna 336 may radiate at the frequency at which the OFDM symbols were up-converted. Accordingly, the wireless transmitter 300 may transmit an RF transmission via the antenna 336 based on the input data X (i,j) 310 received at the scrambler 304. As described above with respect to FIG. 3, the operations of the wireless transmitter 300 can include a variety of processing operations. Such operations can be implemented in a conventional wireless transmitter, with each operation implemented by specifically-designed hardware for that respective operation. For example, a DSP processing unit may be specifically-designed to implement the IFFT 324. As can be appreciated, additional operations of wireless transmitter 300 may be included in a conventional wireless receiver, and some operations depicted with respect to FIG. 3 may not be implemented in a conventional wireless transmitter.

Figure 4:
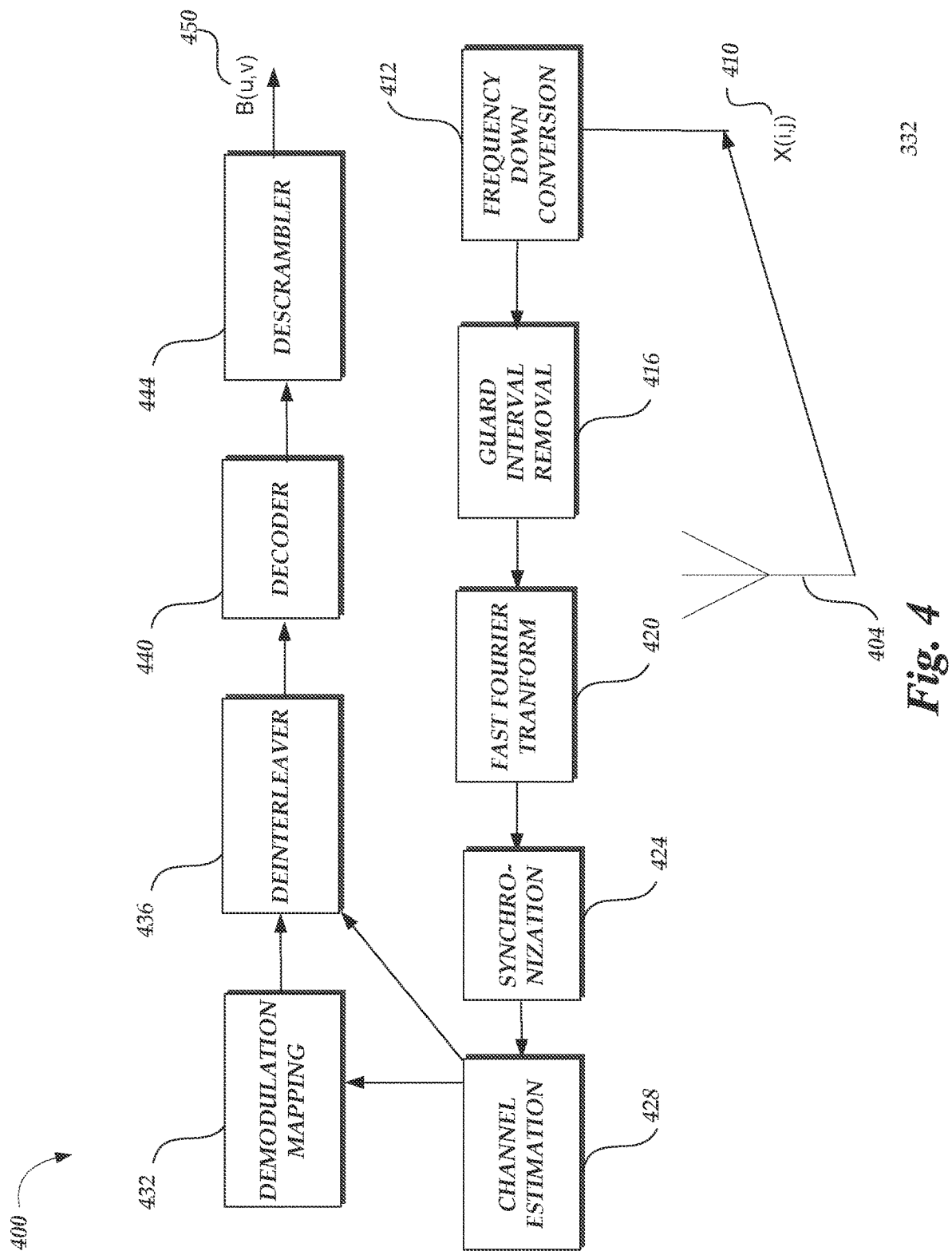
FIG. 4 is a schematic illustration of wireless receiver.

FIG. 4 is a schematic illustration of wireless receiver 400. The wireless receiver 400 receives input data X (i,j) 410 from an antenna 404 and performs operations of a RF wireless receiver to generate output data B (u,v) 450. The antenna 404 may be an antenna designed to receive at a specific radio frequency. The operations of the RF wireless receiver may be performed with analog circuitry or processed as a digital baseband operation for implementation of a digital front-end. The operations of the RF wireless receiver include a frequency down conversion 412, guard interval removal 416, a fast Fourier transform 420, synchronization 424, channel estimation 428, a demodulation mapping 432, a deinterleaver 436, a decoder 440, and a descrambler 444.

The frequency down conversion 412 may down convert the frequency domain symbols to a baseband processing range. For example, continuing in the example of an OFDM implementation, the time-domain OFDM symbols may be mixed with a local oscillator frequency to generate OFDM symbols at a baseband frequency range. Accordingly, the RF transmission including time-domain OFDM symbols may be down-converted to baseband. The guard interval 416 may remove a guard interval from the frequency-domain OFDM symbols. The FFT 420 may transform the time-domain OFDM symbols into frequency-domain OFDM symbols. For example, taking an example of an OFDM wireless protocol scheme, the FFT can be applied as N-point FFT $$X_N = \sum_{k=1}^{N} x_k e^{-i2\pi k n/N} \quad (8)$$

where $X_n$ is the modulated symbol sent in the nth OFDM sub-carrier. Accordingly, the output of the FFT 420 may form frequency-domain OFDM symbols. In some examples, the FFT 420 may be replaced by poly-phase filtering banks to output symbols for synchronization 424.

The synchronization 424 may detect pilot symbols in the OFDM symbols to synchronize the transmitted data. In some examples of an OFDM implementation, pilot symbols may be detected at the beginning of a frame (e.g., in a header) in the time-domain. Such symbols can be used by the receiver 400 for frame synchronization. With the frames synchronized, the OFDM symbols proceed to channel estimation 428. The channel estimation 428 may also use the time-domain pilot symbols and additional frequency-domain pilot symbols to estimate the time or frequency effects (e.g., path loss) to the received signal. For example, a channel may be estimated based on N signals received through N antennas (in addition to the antenna 404) in a preamble period of each signal. In some example, the channel estimation 428 may also use the guard interval that was removed at the guard interval removal 416. With the channel estimate, the channel estimation 428 may compensate the frequency-domain OFDM symbols by some factor to minimize the effects of the estimated channel. While channel estimation has been described in terms of time-domain pilot symbols and frequency-domain pilot symbols, it can be appreciate that that other channel estimation techniques or systems are possible, such as a MIMO-based channel estimation system or a frequency-domain equalization system. The demodulation mapping 432 may demodulate the data outputted from the channel estimation 428. For example, a quadrature amplitude modulation (QAM) demodulator can map the data by changing (e.g., modulating) the amplitude of the related carriers. Any modulation mapping described herein can have a corresponding demodulation mapping as performed by demodulation mapping 432. In some examples, the demodulation mapping 432 may detect the phase of the carrier signal to facilitate the demodulation of the OFDM symbols. The demodulation mapping 432 may generate bit data from the OFDM symbols to be further processed by the deinterleaver 436

The deinterleaver 436 may deinterleave the data bits, arranged as parity block from demodulation mapping into a bit stream for the decoder 440, for example, the deinterleaver 436 may perform an inverse operation to convolutional byte interleaving. The deinterleaver 436 may also use the channel estimation to compensate for channel effects to the parity blocks. The decoder 440 may decode the data outputted from the scrambler to code the data. For example, a Reed-Solomon (RS) decoder or turbo decoder may be used as a decoder to generate a decoded bit stream for the descrambler 444. For example, a turbo decoder may implement a parallel concatenated decoding scheme. In some examples, additional decoding deinterleaving may be performed after the decoder 440 and deinterleaver 436. For example, additional coding may include an outer coder that may further decode data output from the decoder 440. While described in the context of a RS decoding and turbo decoding, various decoders 440 are possible. The descrambler 444 may convert the output data from decoder 440 from a pseudo-random or random binary sequence to original source data. For example, the descrambler 44 may convert decoded data to a transport layer destination (e.g., MPEG-2 transport stream) that is descrambled with an inverse to the generator polynomial of the scrambler 304. The descrambler thus outputs data B (u,v) 450. Accordingly, the wireless receiver 400 receives an RF transmission including input data X (i,j) 410 via to generate output data B (u,v) 450.

As described above with respect to FIG. 4, the operations of the wireless receiver 400 can include a variety of processing operations. Such operations can be implemented in a conventional wireless receiver, with each operation implemented by specifically-designed hardware for that respective operation. For example, a DSP processing unit may be specifically-designed to implement the FFT 420. As can be appreciated, additional operations of wireless receiver 400 may be included in a conventional wireless receiver, and some operations depicted with respect to FIG. 4 may not be implemented in a conventional wireless receiver.

Figure 5:
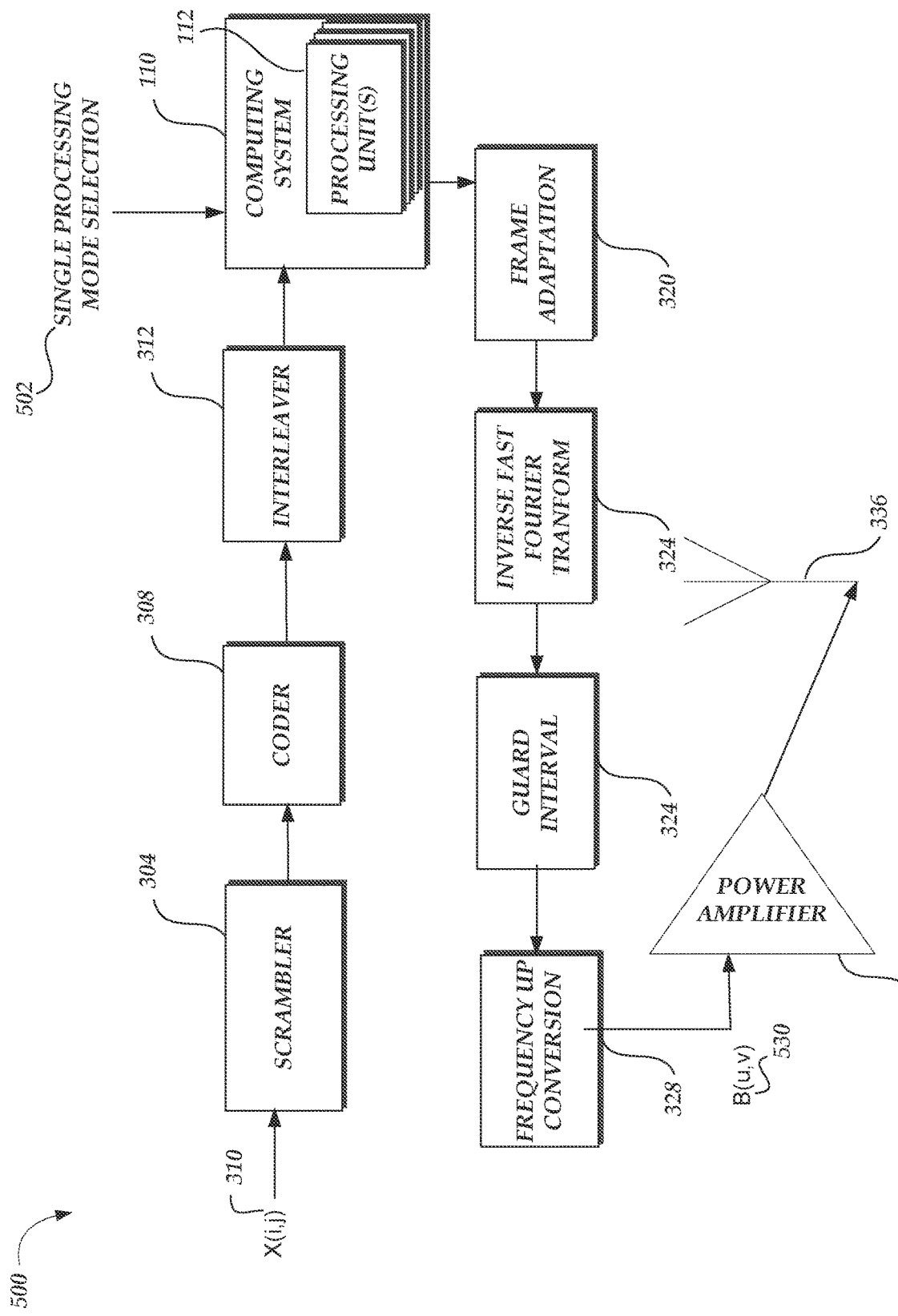
FIG. 5 is a schematic illustration of a wireless transmitter in accordance with examples described herein.

FIG. 5 is a schematic illustration of a wireless transmitter 500 in accordance with examples described herein. FIG. 5 shows a wireless transmitter that may perform several operations of an RF-front end for a wireless transmission with input data X (i,j) 310, including scrambler 304, a coder 308, an interleaver 312, a frame adaptation 320, an IFFT 324, a guard interval 324, and frequency up conversion 328. The transmitter 500 utilizes a computing system 110 with a processing unit 112 to perform the operation of modulation mapping, such as modulation mapping 316. For example, the processing unit 112 of computing system 110 executes instructions 115 that mix input data with coefficient data. In the example of transmitter 500, the input data (e.g., input data X (i,j) 210a-c) of the computing system 110 may be the output of the interleaver 312; the output data (e.g., output data B (u,v) 220a-c) of the computing system 110 may be the input to the frame adaptation 320. For example, the input data of the computing system 110 may be multiplied with the coefficient data to generate a multiplication result at multiplication unit/accumulation unit, and the multiplication result may be accumulated at that multiplication unit/accumulation unit to be further multiplied and accumulated with other portions of the input data and additional coefficients of the plurality of coefficients. For example, the processing unit 112 utilizes selected coefficient such that mixing the coefficients with input data generates output data that reflects the processing of the input data with coefficients by the circuitry of FIG. 2.

The computing system 110 of the transmitter 500 may retrieve coefficient data specific to a single processing mode selection 502. As depicted in FIG. 5, the computing system 110 may receive a single processing mode selection 502. As described herein, the single processing mode may correspond to an aspect of a wireless protocol. Accordingly, in the example of system 500, the single mode processing selection 502 may correspond to the modulation mapping aspect of a wireless protocol. When such a selection 502 is received, the computing system 110 may execute instructions for implementing a processing mode encoded in the computer readable media 117. For example, the instructions 117 may include selecting a single processing mode from among multiple single processing modes, each single processing mode with respective coefficient data.

The single mode processing selection 502 may also indicate the aspect of the wireless protocol for which the computing system 110 is to execute instructions 115 to generate output data corresponding to the operation of that aspect of the wireless protocol. As depicted, the single processing mode selection 502 indicates that the computing system 110 is operating as a modulation mapping aspect for the wireless transmitter 500. Accordingly, the computing system 110 may implement a modulation mapping processing mode to process the input data to retrieve coefficient data corresponding to the selection of the modulation mapping processing mode. That coefficient data may be mixed with input data to the computing system 110 to generate output data when instructions 115 are executed.

The single processing mode selection 502 may also indicate a type of modulation mapping. For example, the modulation mapping can be associated with a modulation scheme including, but not limited to: GFDM, FBMC, UFMC, DFDM, SCMA, NOMA, MUSA, or FTN. It can be appreciated that each aspect of a wireless protocol with a corresponding single processing mode can include various types of that aspect, such as a modulation mapping processing mode having a variety of modulation schemes from which to select.

The coefficient data corresponding to the selection of the modulation mapping processing mode may be retrieved from a memory (e.g., memory 130 or a cloud-computing database). The coefficients retrieved from the memory are specific to the single processing mode selection 502. In the context of the example of transmitter 500, the single processing mode selection 502 may indicate that coefficient data specific to a modulation mapping processing mode are to be retrieved from the memory. Accordingly, the output data from the computing system 110 in transmitter 500 may be representative of a portion of the transmission of the transmitter being processed according to the modulation processing mode selection. The computing system 110 may output the data such the frame adaptation 320 receives the output data for further processing of the transmission.

While described above in the context of a modulation mapping processing mode, it is to be appreciated that other single processing modes are possible including, but not limited to: a fast Fourier transform (FFT) processing mode, an inverse fast Fourier transform (IFFT) processing mode, a turbocoding processing mode, a decoding processing mode, a Reed Solomon processing mode, an interleaver processing mode, a deinterleaving processing mode, a demodulation mapping processing mode, a scrambling processing mode, a descrambling processing mode, a channel estimation processing mode, or combinations thereof. For example, while FIG. 5 illustrates a single processing mode selection 502 being received at a computing system 110 to implement a modulation mapping processing mode, it is to be appreciated that a computing system 110 may replace any of the RF operations of the wireless transmitter depicted in FIG. 5 to output data B (u,v) 530, such that the single processing mode selection 502 indicates that the computing system 110 may implement another aspect of the wireless transmitter.

Using such a computing system 110, the transmitter 500 may receive input data X (i,j) 310 to mix with coefficient data specific to an aspect of a wireless protocol. For example, the coefficient data may be specific to the modulation mapping aspect of a wireless protocol. The transmitter 500 may generate output data B (u,v) 530 that is representative of the input data being processed according to a wireless transmitter configured to operate with that wireless protocol, such as the wireless transmitter 300. For example, the output data B (u,v) 530 may correspond to an estimate of the output data B (u,v) 330 of FIG. 3.

Figure 6:
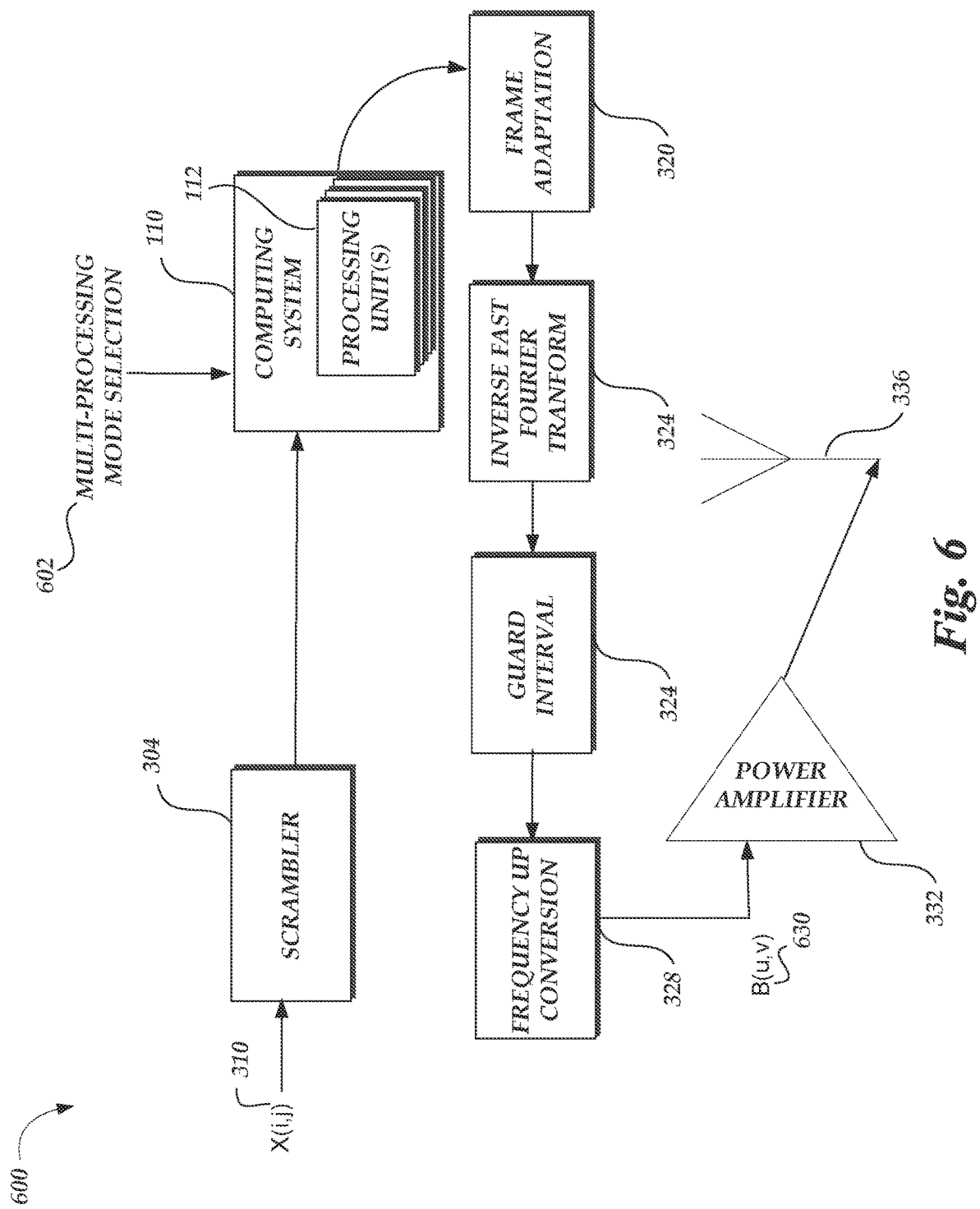
FIG. 6 is a schematic illustration of a wireless transmitter in accordance with examples described herein.

FIG. 6 is a schematic illustration of a wireless transmitter 600 in accordance with examples described herein. FIG. 6 shows a wireless transmitter that performs several operations of an RF-front end for a wireless transmission with input data X (i,j) 310, including scrambler 304, a frame adaptation 320, an IFFT 324, a guard interval 324, and frequency up conversion 328. The transmitter 600 utilizes a computing system 110 with a processing unit 112 to perform the operation of coding, interleaving, and modulation mapping; such as coder 308, interleaver 312, and modulation mapping 316. For example, the processing unit 112 of computing system 110 executes instructions 115 that mix input data with coefficient data. In the example of transmitter 600, the input data (e.g., input data X (i,j) 210a-c) of the computing system 110 can be the output of the scrambler 304; and the output data (e.g., output data B (u,v) 220a-c) of the computing system 110 can be the input to the frame adaptation 320. For example, the input data of the computing system 110 can multiplied with the coefficient data to generate a multiplication result at multiplication unit/accumulation unit, and the multiplication result can be accumulated at that multiplication unit/accumulation unit to be further multiplied and accumulated with other portions of the input data and additional coefficients of the plurality of coefficients. Accordingly, the processing unit 112 utilizes selected coefficient such that mixing the coefficients with input data generates output data that reflects the processing of the input data with coefficients by the circuitry of FIG. 2.

The computing system 110 of the transmitter 600 may retrieve coefficient data specific to a multi-processing mode selection 602. As depicted in FIG. 6, the computing system 110 receives a multi-processing mode selection 602. As described herein, the multi-processing mode may correspond to at least two aspects of a wireless protocol. Accordingly, in the example of system 600, the multi-processing mode selection 602 corresponds to the coding aspect, the interleaving aspect, and the modulation mapping aspect of a wireless protocol. When such a selection 602 is received, the computing system 110 may execute instructions for implementing a processing mode encoded in the computer readable media 117. For example, the instructions 117 may include selecting a multi-processing mode from among multiple multi-processing modes, each multi-processing mode with respective coefficient data.

The multi-processing mode selection 602 may also indicate the aspect of the wireless protocol for which the computing system 110 is to execute instructions 115 to generate output data corresponding to the operation of that aspect of the wireless protocol. As depicted, the multi-processing mode selection 602 indicates that the computing system 110 is operating as a coding, interleaving, and modulation mapping for the wireless transmitter 600. Accordingly, the computing system 110 may implement a specific multi-processing mode to process the input data to retrieve coefficient data corresponding to the selection of that specific multi-processing mode. That coefficient data may be mixed with input data to the computing system 110 to generate output data when instructions 115 are executed.

The multi-processing mode selection 602 may also indicate types of each aspect of the wireless protocol. For example, as described above, the modulation mapping aspect can be associated with a modulation scheme including, but not limited to: GFDM, FBMC, UFMC, DFDM, SCMA, NOMA, MUSA, or FTN. Continuing in the example, the coding aspect can be associated with a specific type of coding such as RS coding or turbocoding. It is to be appreciated that each aspect of a wireless protocol with a corresponding multi-processing mode may include various types of that aspect.

The coefficient data may corresponding to the selection of the multi-processing mode can be retrieved from a memory (e.g., memory 130 or a cloud-computing database). The coefficients retrieved from the memory may be specific to the multi-processing mode selection 602. Accordingly, the output data from the computing system 110 in transmitter 600 may be representative of a portion of the transmission of the transmitter being processed according to the multi-processing mode selection 602. The computing system 110 may output the data such the frame adaptation 320 receives the output data for further processing of the transmission.

While described above in the context of a specific multi-processing mode selection comprising a coding aspect, an interleaving aspect, and a modulation mapping aspect, it is to be appreciated that other multi-processing modes are possible including, but not limited to any combination of single processing modes described above. For example, while FIG. 6 illustrates a multi-processing mode selection 602 being received at a computing system 110 to implement a coding aspect, an interleaving aspect, and a modulation mapping aspect, it can be appreciated that a computing system 110 can replace any of the RF operations of the wireless transmitter depicted in FIG. 6 to output data B (u,v) 630, such that the single processing mode selection 602 indicates that the computing system 110 is to implement at least two aspects of the wireless transmitter.

Using such a computing system 110, the transmitter 600 may receive input data X (i,j) 310 to mix with coefficient data specific to at least two aspects of a wireless protocol. The transmitter 600 generates output data B (u,v) 630 that is representative of the input data being processed according to a wireless transmitter configured to operate with that wireless protocol, such as the wireless transmitter 300. For example, the output data B (u,v) 630 may correspond to an estimate of the output data B (u,v) 330 of FIG. 3.

Figure 7:
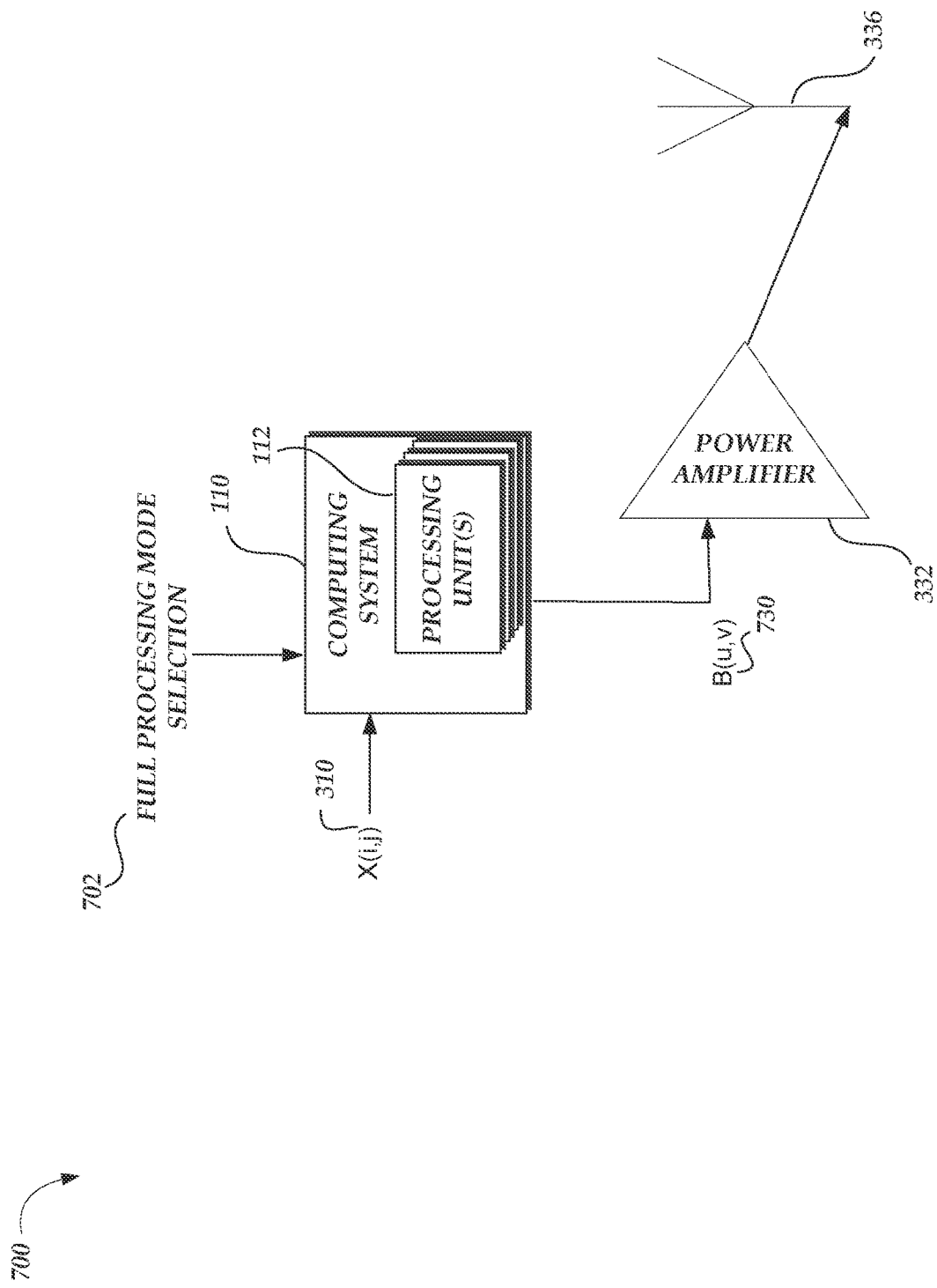
FIG. 7 is a schematic illustration of a wireless transmitter in accordance with examples described herein.

FIG. 7 is a schematic illustration of a wireless transmitter 700 in accordance with examples described herein. The wireless transmitter 700 may perform several operations of an RF-front end for a wireless transmission with input data X (i,j) 310. The transmitter 700 utilizes a computing system 110 with a processing unit 112 to perform the operations of an RF-front end. For example, the processing unit 112 of computing system 110 may execute instructions 115 that mix input data with coefficient data. In the example of transmitter 700, the output data (e.g., output data B (u,v) 220a-c) of the computing system 110 may be the input to power amplifier 332 after processing of the input data X (i,j) 310 (e.g., input data X (i,j) 210a-c). For example, the input data of the computing system 110 may be multiplied with the coefficient data to generate a multiplication result at multiplication unit/accumulation unit, and the multiplication result may be accumulated at that multiplication unit/accumulation unit to be further multiplied and accumulated with other portions of the input data and additional coefficients of the plurality of coefficients. For example, the processing unit 112 utilizes selected coefficient such that mixing the coefficients with input data generates output data that reflects the processing of the input data with coefficients by the circuitry of FIG. 2.

The computing system 110 of the transmitter 700 may retrieve coefficient data specific to a full processing mode selection 702. As depicted in FIG. 7, the computing system 110 may receive a multi-processing mode selection 702. As described herein, the full processing a full processing mode may be a processing mode representative of a wireless transmitter (e.g., a wireless transmitter processing mode) or a processing mode representative of a wireless receiver (e.g., a wireless receiver processing mode). Accordingly, in the example of system 700, the full processing mode selection 702 may correspond to the wireless transmitter processing mode that may implement any aspects of a specific wireless protocol required for a wireless transmitter to implement that protocol. Similarly, a wireless receiver processing mode may implement any aspects of a specific wireless protocol required for a wireless receiver to implement that protocol. When such a selection 702 is received, the computing system 110 may execute instructions for implementing a processing mode encoded in the computer readable media 117. For example, the instructions 117 may include selecting a full processing mode from among multiple full processing mode, each full processing mode with respective coefficient data.

The full processing mode selection 702 may indicate the wireless protocol for which the computing system 110 is to execute instructions 115 to generate output data corresponding to the operation of that the wireless protocol as wireless transmitter. For example, the full processing mode selection 702 may indicate that the wireless transmitter is to implement a 5G wireless protocol that includes a FBMC modulation scheme. Accordingly, the computing system 110 may implement a specific full processing mode to process the input data to retrieve coefficient data corresponding to the selection of that specific full processing mode. That coefficient data can be mixed with input data to the computing system 110 to generate output data when instructions 115 are executed.

The coefficient data can corresponding to the selection of the full processing mode may be retrieved from a memory (e.g., memory 130 or a cloud-computing database). The coefficients retrieved from the memory are specific to the full processing mode selection 702. Accordingly, the output data from the computing system 110 in transmitter 700 may be representative of the transmission being processed according to the full processing mode selection 702.

Using such a computing system 110, the transmitter 700 may receive input data X (i,j) 310 to mix with coefficient data specific to a full processing mode of a wireless protocol. The transmitter 700 may generate output data B (u,v) 730 that is representative of the input data being processed according to a wireless transmitter configured to operate with that wireless protocol, such as the wireless transmitter 300. For example, the output data B (u,v) 730 may correspond to an estimate of the output data B (u,v) 330 of FIG. 3.

In some examples, the wireless transmitter mode may include the operations of a digital baseband processing, an RF front-end, and any fronthaul processing such as compression or estimation. As an example of fronthaul processing, the computing system 110 may operate in a Cloud-Radio Access Network (C-RAN) where wireless base station functionality is divided between remote radio heads (RRHs) and baseband units (BBUs). An RRH may perform RF amplification, up/down conversion, filtering, ADC, or DAC to provide a baseband signal to a BBU. A BBU can process the baseband signals and optimize resource allocation among the RRHs. A fronthaul can be the link between an RRH and a BBU that may perform compression of the baseband signal to send the signal to BBU and that may additionally perform estimation of the fronthaul link to compensate for any effects the fronthaul has on the baseband signal during transmission to the BBU. In such examples, a computing system 110 may operate as either a RRH, a fronthaul, a BBU, or any combination thereof by executing instructions 115 that mix input data with coefficient data and/or executing instructions to implement a processing mode, such as an RRH processing mode, a fronthaul processing mode, or a BBU processing mode.

To train a computing device to generate coefficient data with the output data B (u,v) 730, a wireless transmitter may receive the input associated with a RF wireless transmission. Then, the wireless transmitter may perform operations as an RF front-end according to a wireless protocol, such as modulating the input data for a RF wireless transmission. The output data that is generated by the wireless transmitter can be compared to the input data to generate coefficient data. For example, the comparison can involve a minimization function that optimizes coefficients. Such a minimization function can be represented as an optimization problem with a p-norm:

$$\min \sum_{C1} \cdot \sum_{C2} \left| \overline{B}(u, v) - f\left( \sum_{m,n}^{M,N} a''_{m,n} f\left( \sum_{k,l}^{K,L} a'_{k,l} X(i+k, j+l) \right) \right) \right|^p \quad (9)$$

where C1 stands for the number of the input samples and C2 denotes the number of test vectors involved in the full-processing mode. In an example, the p-norm of the output data from a processing unit 112 (e.g., as represented in Equation 1) subtracted from the output data of a specifically-designed wireless transmitter (e.g., $\overline{B}(u, v)$) is summed across C1 input samples and C2 test vectors. A minimization function analyzes each combination of input samples and test vectors to determine the minimum quantity, which may reflect a minimized error of the difference between the two outputs. The coefficients utilized to generate that minimized quantity reflect the least error estimation of the output from the specifically-designed wireless transmitter. Accordingly, a computing device 110 that compares output data according to the relationships of Equation 9, may be trained to generate coefficient data based on the operations of the wireless transmitter such that mixing arbitrary input data (e.g., test vectors) using the coefficient data generates an approximation of the output data, as if it were processed by the specifically-designed wireless transmitter. The coefficient data may also be stored in a coefficient database (e.g., memory 130), with each set of coefficient data corresponding to a particular wireless protocol that may be utilized in the RF domain for a data transmission. In some examples, an input test vector and an output test vector that emulates the processing of a wireless transmitter can be used to generate the coefficient data In an example of Equation 9, the p-norm of the output data from a processing unit 112 (e.g., as represented in Equation 1) subtracted from the output data of a specifically-designed wireless receiver (e.g., $\overline{B}(u, v)$) is summed across C1 input samples and C2 test vectors. The coefficients utilized to generate a minimized quantity, according to the optimization of Equation 9, reflect the least error estimation of the output from the specifically-designed wireless transmitter. Accordingly, a computing device 110 that compares output data according to the relationships of Equation 9, may be trained to generate coefficient data based on the operations of the wireless receiver such that mixing arbitrary input data (e.g., test vectors) using the coefficient data generates an approximation of the output data, as if it were processed by the specifically-designed wireless receiver.

While some examples herein having a single-processing mode selection (e.g., as depicted in FIG. 5), multi-processing mode selection (e.g., as depicted in FIG. 6), and full processing mode selection (e.g., as depicted in FIG. 7) have been described in the context of a wireless transmitter, in some examples the processing modes may be implemented, as executed by instructions 117 for implementing a processing mode, in a wireless receiver, such as the wireless receiver 400 of FIG. 4, with corresponding aspects of a wireless protocol being implemented by a computing system 110 with processing unit(s) 112. For example, a computing system may receive wireless input data from an antenna 404 with a computing system 110 implementing a wireless receiver processing mode, as indicated by a full processing mode selection indicating a wireless receiver processing mode. Accordingly, any aspect of a wireless transmitter or a wireless receiver, whether a single aspect, multi-aspect, or full implementation, may be implemented by a computing system 110 with processing unit(s) 112 implementing instructions 115 for mixing input data with coefficient data and instructions 117 for implementing a processing mode. Similarly, a computing device 110 may be trained with coefficient data generated from a wireless receiver configured to operate in accordance with a wireless protocol. For example, the output data that is generated by the wireless receiver (or any aspect of a wireless receiver) may be compared to the input data to generate coefficient data.

Additionally or alternatively, any processing mode selection may indicate types of each aspect of the wireless protocol. For example, a modulation mapping aspect may be associated with a modulation scheme including, but not limited to: GFDM, FBMC, UFMC, DFDM, SCMA, NOMA, MUSA, or FTN. Each aspect of a wireless protocol with a corresponding processing mode may include various types of that aspect. For example, the full processing mode selection 702 may indicate an aspect for up conversion to a 5G wireless frequency range, such as utilizing a carrier frequency in the E-band (e.g., 71-76 GHz and 81-86 GHz), a 28 GHz Millimeter Wave (mmWave) band, or a 60 GHz V-band (e.g., implementing a 802.11 ad protocol). In some examples, the full processing mode selection 702 may also indicate whether a Multiple-Input Multiple-Output (MIMO) implementation is to be utilized, for example, the selection 702 may indicate that a 2×2 spatial stream may be utilized.

Figure 8:
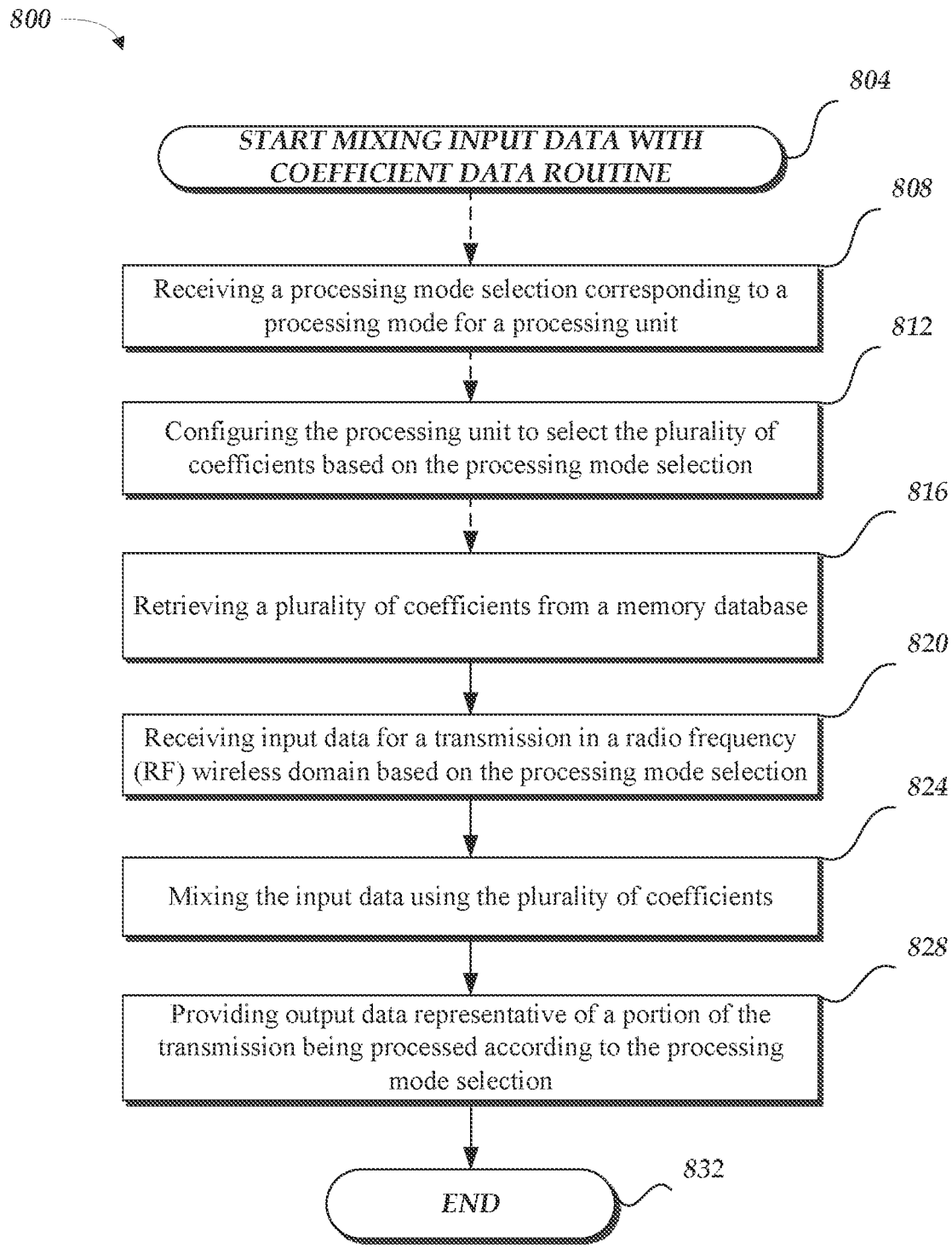
FIG. 8 is a flowchart of a method arranged in accordance with examples described herein.

FIG. 8 is a flowchart of a method 800 in accordance with examples described herein. Example method 800 may be implemented using, for example, system 100 in FIG. 1, system 200 in FIG. 2, or any system or combination of the systems depicted in FIGS. 3-7 described herein. In some examples, the blocks in example method 800 may be performed by a computing device such as a computing device 110 of FIG. 1 and/or in conjunction with a processing unit, such as processing unit 112 of FIG. 2. The operations described in blocks 804-832 may also be stored as computer-executable instructions in a computer-readable medium such as a computer readable medium 115.

Example method 800 may begin with a block 804 that starts execution of the mixing input data with coefficient data routine. The method may include a block 808 that recites "receiving a processing mode selection corresponding to a processing mode for a processing unit." As described herein, the processing mode selection may be received as a selection from a touchscreen of a computing device that communicates with the computing system 110. Processing mode selections may be received from any computing device that can receive user input regarding processing mode selections Block 808 may be followed by block 812 that recites "configuring the processing unit to select the plurality of coefficients based on the processing mode selection." As described herein, configuring the processing unit may include configuring the processing unit for various processing modes depending on the processing mode selection. Configuring the processing unit may include configuring the processing unit for various modes, including a single processing mode, a multi-processing mode, and a full processing mode. For example, a computing system may operate in single-processing mode as a turbocoding operation to output data according to data being encoded with the turbocoding operation. Block 812 may be followed by block 816 that recites "retrieving a plurality of coefficients from a memory database." As described herein, the processing unit may retrieve coefficients for mixing with input data; for example, utilizing a memory look-up unit. For example, the memory database may store associations between coefficients and wireless protocols and/or processing modes described herein. For example, the processing unit may request the coefficients from a memory database part of the implementing computing device, from a memory database part of an external computing device, or from a memory database implemented in a cloud-computing device. In turn, the memory database may send the plurality of coefficients as requested by the processing unit.

Block 816 may be followed by block 820 that recites "receiving input data for a transmission in a radio frequency (RF) wireless domain based on the processing mode selection." As described herein, the processing unit may be configured to receive a variety of types of input data, such as a data bit stream, coded bits, modulated symbols, and the like that may be transmitted or received by a wireless transmitter or wireless receiver respectively. In an example, the processing unit, in a single processing mode, may implement the functionality of an operation of a portion of the wireless transmitter or receiver. In the example of the turbocoding operation, the processing unit may receive a data bit stream to be coded, including an indication regarding a parameter of the turbocoding operation. In an example of an IFFT operation, the processing unit may receive a data bit stream to be transformed to frequency-domain, including an indication regarding a parameter of the IFFT operation, such as the point size for the IFFT operation to utilize. In an example of a multi-processing mode operation of DAC, the input data may be digital data to be converted to analog data for transmitting at an antenna of a wireless transmitter. In some examples, a parameter regarding an aspect of an operation may be received in the processing mode selection. For example, the parameter of the IFFT operation, such as the point size for the IFFT operation, may be received as information included in a single-processing mode selection, a multi-processing mode selection, or a full processing mode selection. Block 820 may be followed by block 824 that recites "mixing the input data using the plurality of coefficients." As described herein, the processing unit utilizes the plurality of coefficients such that mixing the coefficients with input data generates output data that reflects the processing of the input data with coefficients by the circuitry of FIG. 2. For example, various ALUs in an integrated circuit may be configured to operate as the circuitry of FIG. 2, thereby mixing the input data with the coefficients as described herein. In some examples, various hardware platforms may implement the circuitry of FIG. 2, such as an ASIC, a DSP implemented as part of a FPGA, or a system-on-chip. Block 824 may be followed by block 828 that recites "providing output data representative of a portion of the transmission being processed according to the processing mode selection." As described herein, the output data may be provided to another portion of specifically-designed hardware such as another portion of a wireless transmitter or receiver, or an antenna for wireless, RF transmission. In an example of a full processing mode selection, the output data may be provided to an application requesting the output data from a wireless endpoint, such that the output data was provided to the application as part of a processing unit implementing a wireless receiver. Block 828 may be followed by block 832 that ends the example method 800. In some examples, the blocks 808 and 812 may be optional blocks.

Figure 9:
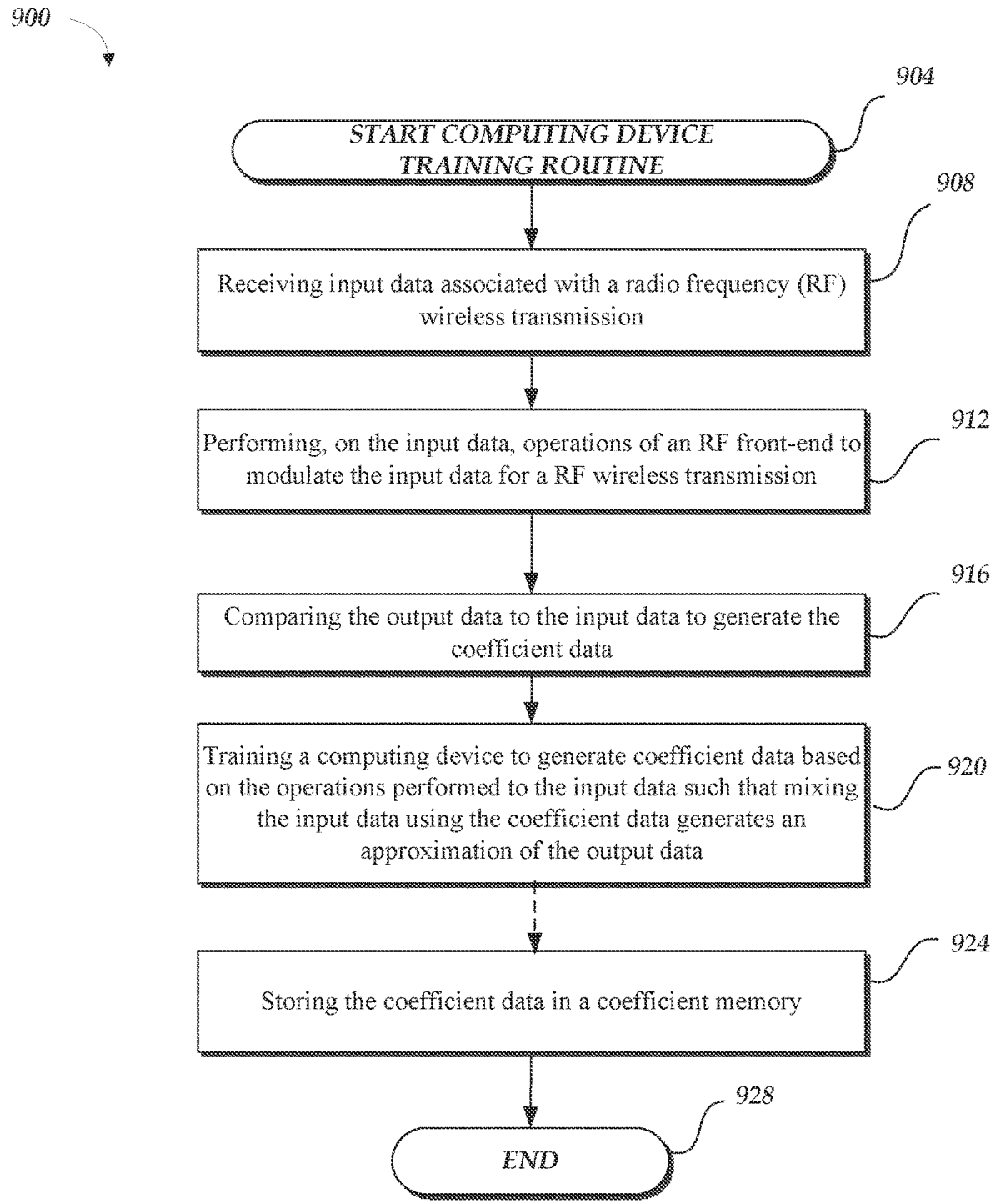
FIG. 9 is a flowchart of a method arranged in accordance with examples described herein.

FIG. 9 is a flowchart of a method 900 in accordance with examples described herein. Example method 900 may be implemented using, for example, system 100 in FIG. 1, system 200 in FIG. 2, or any system or combination of the systems depicted in FIGS. 3-7 described herein. In some examples, the blocks in example method 900 may be performed by a computing device such as a computing device 110 of FIG. 1 and/or in conjunction with a processing unit 112 of FIG. 2. The operations described in blocks 904-928 may also be stored as computer-executable instructions in a computer-readable medium such as a computer readable medium 115 or computer readable 117.

Example method 900 may begin with a block 904 that starts execution of the mixing input data with coefficient data routine. The method may begin with a block 908 that recites "receiving input data associated with a radio frequency (RF) wireless transmission." As described herein, the processing unit may be configured to receive a variety of types of input data, such as a data bit stream, coded bits, modulated symbols, and the like that may be transmitted or received by a wireless transmitter or wireless receiver respectively. In an example, the processing unit, in a single processing mode, may implement the functionality of an operation of a portion of the wireless transmitter or receiver. In the example of the turbocoding operation, the processing unit may receive a data bit stream to be coded, including an indication regarding a parameter of the turbocoding operation. In an example of an IFFT operation, the processing unit may receive a data bit stream to be transformed to frequency-domain, including an indication regarding a parameter of the IFFT operation, such as the point size for the IFFT operation to utilize. In an example of a multi-processing mode operation of DAC, the input data may be digital data to be converted to analog data for transmitting at an antenna of a wireless transmitter. In some examples, a parameter regarding an aspect of an operation may be received in the processing mode selection. For example, the parameter of the IFFT operation, such as the point size for the IFFT operation, may be received as information included in a single-processing mode selection, a multi-processing mode selection, or a full processing mode selection. Block 908 may be followed by block 912 that recites "performing, on the input data, operations of an RF front-end to modulate the input data for a RF wireless transmission." As described herein, a specifically-designed wireless transmitter may perform RF front-end operations, such as scrambling, coding, interleaving, modulation mapping, frequency up-conversion, and the like described above to transmit the input data as an RF wireless transmission. In an example, a specifically-designed wireless transmitter may perform only a portion of the RF front-end operations to train a computing device for a specific operation of the wireless transmitter, such that the coefficient data generated by the computing device may be utilized in a single processing mode or a multi-processing mode.

Block 912 may be followed by block 916 that recites "comparing the output data to the input data to generate the coefficient data." As described herein, a computing device may compare the output data from the specifically-designed wireless transmitter to output data generated from a processing unit of the computing device implementing the operation of the wireless transmitter. For example, the computing device may use a least error p-norm comparison, as part of a minimization function, between the two outputs to determine whether the coefficient data represents an estimation of the specifically-designed wireless transmitter. In an example, the computing device may use a least squares error function, as part of an optimization problem, between the two outputs to determine whether the coefficient data represents an estimation of the specifically-designed wireless transmitter. Block 916 may be followed by block 920 that recites "training a computing device to generate coefficient data based on the operations performed to the input data such that mixing the input data using the coefficient data generates an approximation of the output data." As described herein, the computing device may compare the output data from the specifically-designed wireless transmitter to output data generated from a processing unit of the computing device implementing the operation of the wireless transmitter across a variety of test vectors and input samples to train the computing device to determine a minimized error. For example, the minimized error, trained across various input samples and test vectors may represent the optimized estimation of the processing of the input data in the specifically-designed hardware. In an example, training the computing device according to input samples and test vectors may be referred to as supervised learning of the computing device to generate coefficient data. In various examples, the computing device may also be trained to generate coefficient data according to unsupervised learning. For example, the computing device may monitor output of the specifically-designed hardware to learn which coefficient data may minimize the error of a processing unit of the computing device implementing the operation of the wireless transmitter. Block 920 may be followed by block 924 that recites "storing the coefficient data in a coefficient memory." As described herein, the computing device may store the coefficients in a memory, such as a memory database. For example, the memory may store associations between coefficients and wireless protocols and/or processing mode, as trained by the computing device. For example, the computing device may store the coefficients in a memory part of the computing device itself, in a memory of an external computing device, or in a memory implemented in a cloud-computing device. Block 924 is followed by the block 928 that ends the example method 900. In some examples, the block 924 may be an optional block.

The blocks included in the described example methods 800 and 900 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

From the foregoing it will be appreciated that, although specific embodiments of the invention have been described herein for purposes of illustration, various modifications may be made without deviating from the spirit and scope of the invention.

What is claimed is:

1. A method for processing wireless communications using a configurable algorithm, the method comprising:
receiving input data for digital signal processing;
receiving coefficient data specific to a wireless protocol, wherein the coefficient data is
generated using a computing device trained using training input data based on comparing output data of a processing unit of the computing device to an output generated, at least in part, using a wireless transmitter implementing an RF front-end, and wherein comparing the output data of the processing unit of the computing device to the output generated, at least in part, using the wireless transmitter implementing the RF front-end includes using a least error p-norm comparison; and
mixing the input data with the coefficient data to generate output data representative of a transmission being processed according to the wireless protocol, wherein the input data is represented as symbols to be modulated, and wherein the output data is formatted for transmission by an antenna.

2. The method of claim 1, wherein the wireless protocol is a 5G wireless protocol selected from a group comprising filter bank multi-carrier (FBMC), generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing.

3. The method of claim 1, wherein the input data and coefficient data are mixed in a computing system with processing units.

4. The method of claim 1, further comprising processing the input data based on one or more of a time domain, a frequency domain, or a code domain.

5. A wireless communication device, comprising:
a processor configured to receive input data for digital signal processing and coefficient data specific to a wireless protocol, wherein the processor is further configured to mix the input data with the coefficient data to generate output data representative of a transmission being processed according to the wireless protocol, wherein the input data is represented as symbols to be modulated, wherein the output data is formatted for transmission by an antenna, wherein the coefficient data is generated using a computing device trained using training input data based on comparing output data of a processing unit of the computing device to an output generated, at least in part, using a wireless transmitter implementing an RF front-end, and wherein comparing the output data of the processing unit of the computing device to the output generated, at least in part, using the wireless transmitter implementing the RF front-end includes using a least error p-norm comparison.

6. The wireless communication device of claim 5, wherein the wireless protocol is a 5G wireless protocol selected from a group comprising filter bank multi-carrier (FBMC), generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing.

7. The wireless communication device of claim 5, wherein the processor is configured to operate for different wireless protocol settings, including one or more inverse fast Fourier transform (IFFT) settings.

8. The wireless communication device of claim 5, further comprising a coefficient database configured to store sets of coefficient data corresponding to various wireless protocols, including the coefficient data.

9. The wireless communication device of claim 5, wherein the processor is further configured to receive a processing mode selection from a user, the processing mode selection indicating a specific processing mode, and to provide output data that is representative of the data transmission being processed according to the selected processing mode.

10. A non-transitory computer-readable medium storing instructions that, when executed by a processor, cause the processor to:
receive input data for digital signal processing;
receive coefficient data specific to a wireless protocol, wherein the coefficient data is
generated using a computing device trained using training input data based on comparing output data of a processing unit of the computing device to an output generated, at least in part, using a wireless transmitter implementing an RF front-end, and wherein comparing the output data of the processing unit of the computing device to the output generated, at least in part, using the wireless transmitter implementing the RF front-end includes using a least error p-norm comparison; and
mix the input data with the coefficient data to generate output data representative of a transmission being processed according to the wireless protocol, wherein the input data is represented as symbols to be modulated, and wherein the output data is formatted for transmission by an antenna.

11. The non-transitory computer-readable medium of claim 10, wherein the wireless protocol is a 5G wireless protocol selected from a group comprising filter bank multi-carrier (FBMC), generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing.

12. The non-transitory computer-readable medium of claim 10, further comprising instructions that, when executed by the processor, cause the processor to mix the input data and coefficient data in a computing system with processing units.

13. The non-transitory computer-readable medium of claim 10, further comprising instructions that, when executed by the processor, cause the processor to process the input data based on one or more of a time domain, a frequency domain, or a code domain.

14. The non-transitory computer-readable medium of claim 10, further comprising instructions that, when executed by the processor, cause the processor to operate for different wireless protocol settings, including one or more inverse fast Fourier transform (IFFT) settings.

15. The non-transitory computer-readable medium of claim 10, further comprising instructions that, when executed by the processor, cause the processor to access a coefficient database configured to store sets of coefficient data corresponding to one or more wireless protocols.

16. The non-transitory computer-readable medium of claim 10, further comprising instructions that, when executed by the processor, cause the processor to receive a processing mode selection from a user, the processing mode selection indicating a specific processing mode, and to provide output data that is representative of the data transmission being processed according to the selected processing mode.

17. The non-transitory computer-readable medium of claim 16, wherein the processing mode selection comprises a single processing mode, a multi-processing mode, or a full processing mode.

18. The non-transitory computer-readable medium of claim 10, wherein the coefficient data is utilized to process various aspects of a wireless protocol selected from the group comprising: baseband processing of a wireless transmitter, baseband processing of a wireless receiver, processing of a digital front-end transmitter, analog-to-digital conversion (ADC) processing, digital-to-analog (DAC) conversion processing, digital up conversion (DUC), digital down conversion (DDC), direct digital synthesizer (DDS) processing, DDC with DC offset compensation, digital pre-distortion (DPD), peak-to-average power ratio (PAPR) determinations, crest factor reduction (CFR) determinations, pulse-shaping, image rejection, delay/gain/imbalance compensation, noise-shaping, numerical controlled oscillator (NCO), self-interference cancellation (SIC), a modulation algorithm, an error-correction coding or decoding algorithm, channel estimation, a pre-coding algorithm, and a combination thereof.

19. The method of claim 1, wherein representation of the input data is based on one or more of a time index, a sub-carrier index, a time-symbol index, a number of symbols per sub-carrier, a number of active sub-carriers, or a total number of sub-carriers.

\* \* \* \* \*